US012695491B2

(12) United States Patent
Abebe et al.

(10) Patent No.: US 12,695,491 B2
(45) Date of Patent: Jul. 28, 2026

(54) METHOD AND APPARATUS FOR REPORTING DOPPLER INFORMATION OF TIME-VARYING CHANNEL IN WIRELESS COMMUNICATION SYSTEMS

(71) Applicant: Samsung Electronics Co., Ltd., Suwon-si (KR)

(72) Inventors: Ameha Tsegaye Abebe, Suwon-si (KR); Hyoungju Ji, Suwon-si (KR); Younsun Kim, Suwon-si (KR); Youngrok Jang, Suwon-si (KR); Kyungjun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 652 days.

(21) Appl. No.: 18/147,384

(22) Filed: Dec. 28, 2022

(65) Prior Publication Data
US 2023/0208493 A1    Jun. 29, 2023

(30) Foreign Application Priority Data

Dec. 28, 2021    (KR) ........................ 10-2021-0189754

(51) Int. Cl.
*H04B 7/06*        (2006.01)
*H04B 7/01*        (2006.01)
(52) U.S. Cl.
CPC ............. *H04B 7/0626* (2013.01); *H04B 7/01* (2013.01); *H04B 7/0639* (2013.01)
(58) Field of Classification Search
CPC ...... H04B 7/0626; H04B 7/01; H04B 7/0639; H04B 7/063; H04B 7/0645; H04B 7/06952; H04B 7/0628; H04W 8/24
See application file for complete search history.

(56) References Cited

U.S. PATENT DOCUMENTS

2017/0134082 A1    5/2017    Onggosanusi et al.
2018/0183554 A1*   6/2018    Lim ........................ H04L 5/005
(Continued)

FOREIGN PATENT DOCUMENTS

WO    2021/008007 A1    1/2021
WO    2021/102952 A1    6/2021

OTHER PUBLICATIONS

International Search Report and written opinion dated Mar. 31, 2023, Issued in International Application No. PCT/KR2022/021488.

(Continued)

*Primary Examiner* — Noel R Beharry
*Assistant Examiner* — Angelie T Ngo
(74) *Attorney, Agent, or Firm* — Jefferson IP Law, LLP

(57)        ABSTRACT

The disclosure relates to a fifth generation (5G) or sixth generation (6G) communication system for supporting a higher data transmission rate. A method performed by a user equipment (UE) in a communication system is provided. The method includes transmitting, to a base station, capability information indicating a capability for state information (CSI) report with Doppler information, receiving, from the base station, configuration enabling a time correlated CSI report, obtaining the time correlated CSI report including precoding matrix indicator (PMI) indicating the Doppler information based on one or more CSI-reference signals (CSI-RS), and transmitting the time correlated CSI report to the base station.

12 Claims, 25 Drawing Sheets

(56)           References Cited

U.S. PATENT DOCUMENTS

| | | | |
|---|---|---|---|
| 2019/0158155 A1 | 5/2019 | Park et al. | |
| 2021/0143885 A1 | 5/2021 | Brobmann et al. | |
| 2021/0218453 A1* | 7/2021 | Song | H04L 5/0057 |
| 2021/0226674 A1* | 7/2021 | Ramireddy | H04B 7/0417 |
| 2021/0234574 A1 | 7/2021 | Mao | |
| 2021/0359828 A1 | 11/2021 | Levitsky et al. | |
| 2023/0379739 A1* | 11/2023 | Kim | H04W 24/10 |
| 2025/0016593 A1* | 1/2025 | Narayanan | H04L 25/0254 |

OTHER PUBLICATIONS

Extended European Search Report dated Feb. 24, 2025, issued in a European Application No. 22916741.6.

* cited by examiner (401)
Cross-polarized
antenna elements (404)
Vertical array
(2 subarrays)

(402)
A 4x1 subarray (403)
Horizontal array (3 subarrays)

A 12T12R MIMO antenna configuration with
2V3H and 48 antenna elements

{CSI-RS 1, CSI-RS 2,···,CSI-RS M}

1101 — Channel estimation

{$H_1$,$H_2$, ···.$H_M$}

1102 — Channel decomposition

{$W_1$ , $W_2$ , ···,$W_M$}

1103 — Doppler information extraction

METHOD AND APPARATUS FOR REPORTING DOPPLER INFORMATION OF TIME-VARYING CHANNEL IN WIRELESS COMMUNICATION SYSTEMS

CROSS-REFERENCE TO RELATED APPLICATION(S)

This application is based on and claims priority under 35 U.S.C. § 119(a) of a Korean patent application number 10-2021-0189754, filed on Dec. 28, 2021, in the Korean Intellectual Property Office, the disclosure of which is incorporated by reference herein in its entirety.

BACKGROUND

1. Field

The disclosure relates to the field of fifth generation (5G) communication networks. More particularly, the disclosure relates to a channel state information (CSI) reporting for time-varying channel in multiple-input multiple-output (MIMO) system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post long term evolution (LTE) System'. The 5G communication system is considered to be implemented in higher frequency millimeter wave (mmWave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and apparatus for time-varying channel state information (CSI) reporting in communication network, wherein the communication network is at least one of the Fifth Generation (5G) standalone network and a 5G non-standalone (NAS) network.

Another aspect of the disclosure is to provide methods and systems to configure a user equipment (UE) with CSI reporting configuration, that can be used to report time-varying CSI in an efficient manner by utilizing various codebook types.

Additional aspects will be set forth in part in the description which follows and, in part, will be apparent from the description, or may be learned by practice of the presented embodiments.

In accordance with another aspect of the disclosure, a method performed by a user equipment (UE) in a communication system is provided. The method includes transmitting, to a base station, capability information indicating a capability for state information (CSI) report with Doppler information, receiving, from the base station, configuration enabling a time correlated CSI report, obtaining the time correlated CSI report including precoding matrix indicator (PMI) indicating the Doppler information based on one or more CSI-reference signals (CSI-RS), and transmitting the time correlated CSI report to the base station.

In accordance with an aspect of the disclosure, a method performed by a base station in a communication system is provided. The method includes receiving, from a user equipment (UE), capability information indicating a capability for state information (CSI) report with Doppler information, transmitting, to the UE, configuration enabling a time correlated CSI report, and receiving, from the UE, the time correlated CSI report including precoding matrix indicator (PMI) indicating the Doppler information obtained based on one or more CSI-reference signals (CSI-RS).

In accordance with another aspect of the disclosure, a user equipment (UE) in a communication system is provided. The UE includes a transceiver, and at least one processor configured to transmit, to a base station, capability information indicating a capability for state information (CSI) report with Doppler information, receive, from the base station, configuration enabling a time correlated CSI report, obtain the time correlated CSI report including precoding matrix indicator (PMI) indicating the Doppler information based on one or more CSI-reference signals (CSI-RS), and transmit the time correlated CSI report to the base station.

In accordance with another aspect of the disclosure, a base station in a communication system is provided. The base station includes a transceiver, and at least one processor configured to receive, from a user equipment (UE), capability information indicating a capability for state information (CSI) report with Doppler information, transmit, to the UE, configuration enabling a time correlated CSI report, receive, from the UE, the time correlated CSI report including precoding matrix indicator (PMI) indicating the Doppler information obtained based on one or more CSI-reference signals (CSI-RS).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

4

Figure 10A:
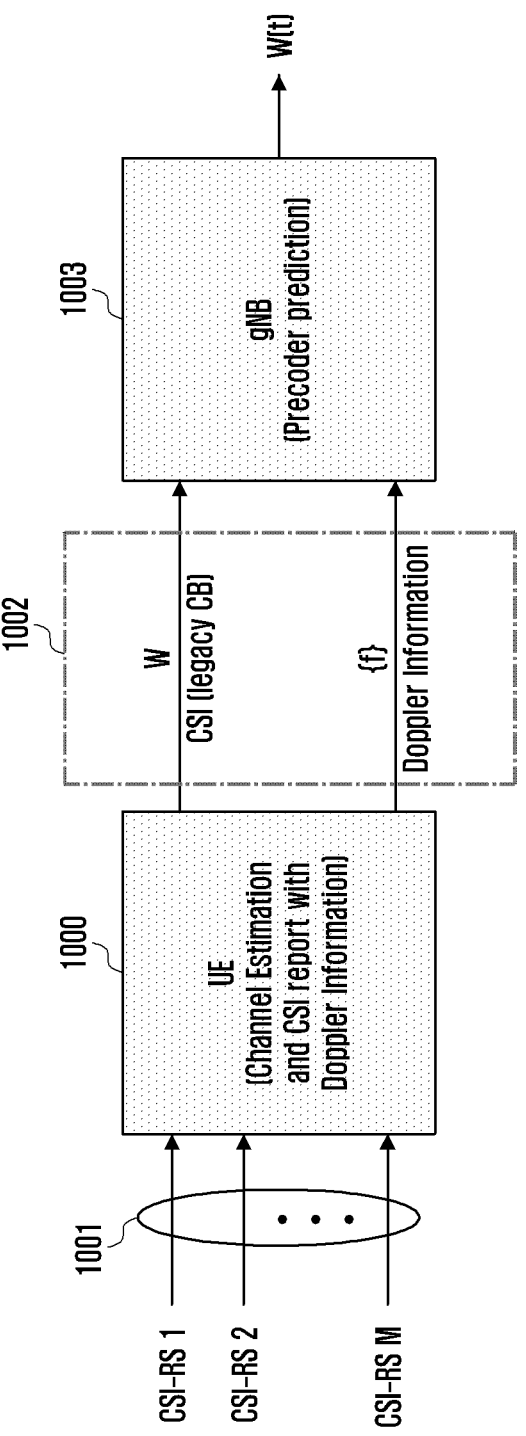
FIG. 10A illustrates a Doppler estimation block at the UE according to an embodiment of the disclosure.
Figure 10B:
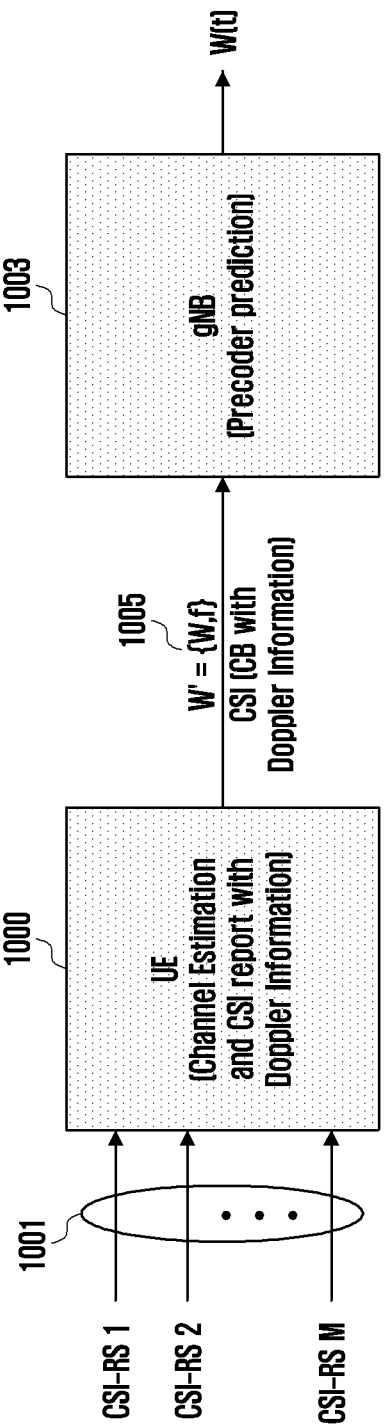
Figure 11:
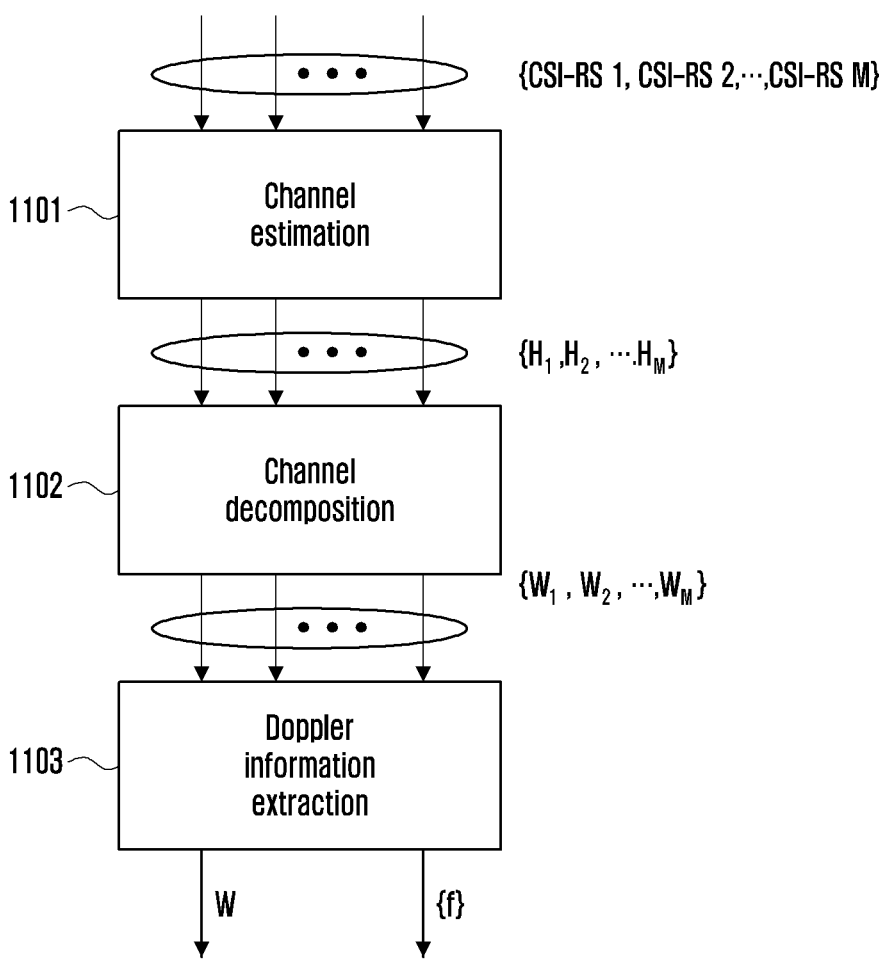
Figure 12:
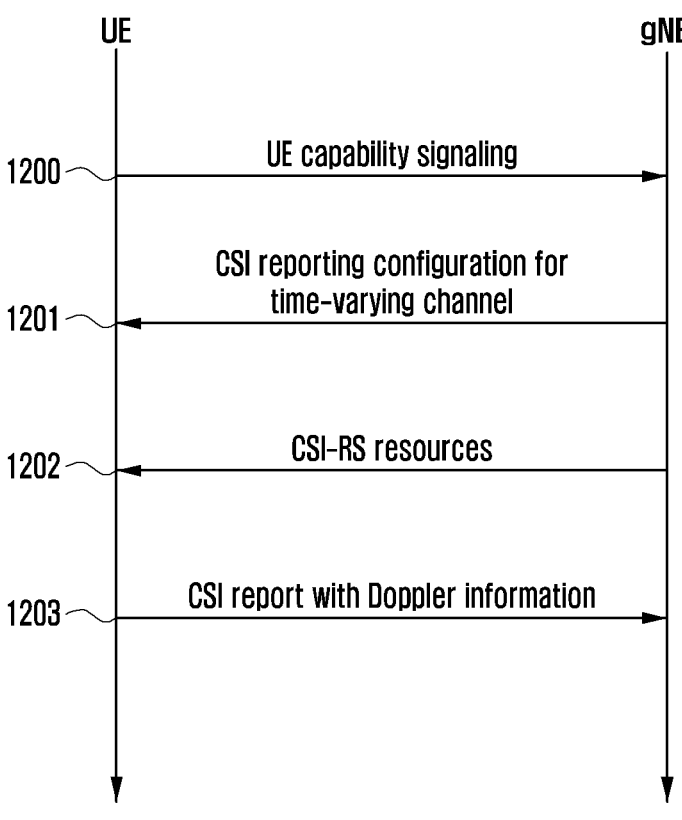
Figure 13:
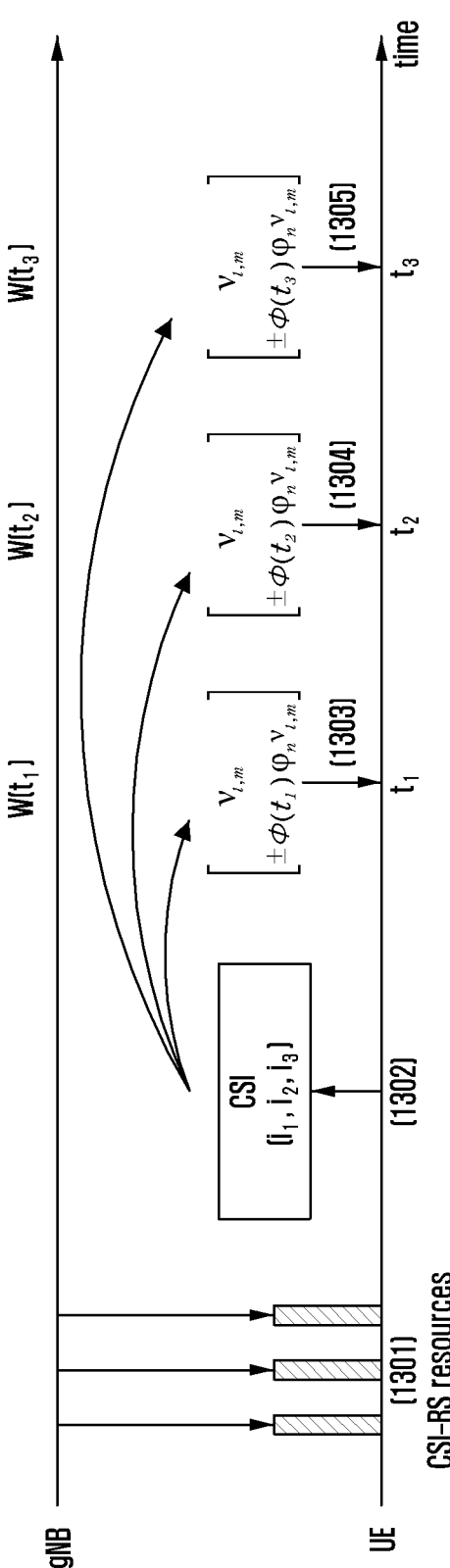
Figure 14:
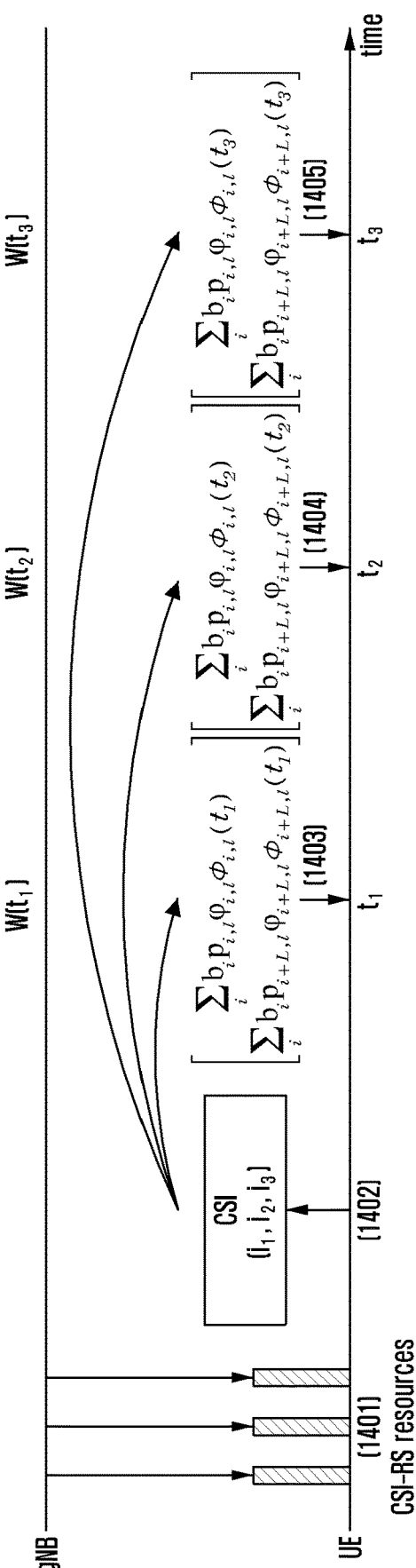
Figure 15:
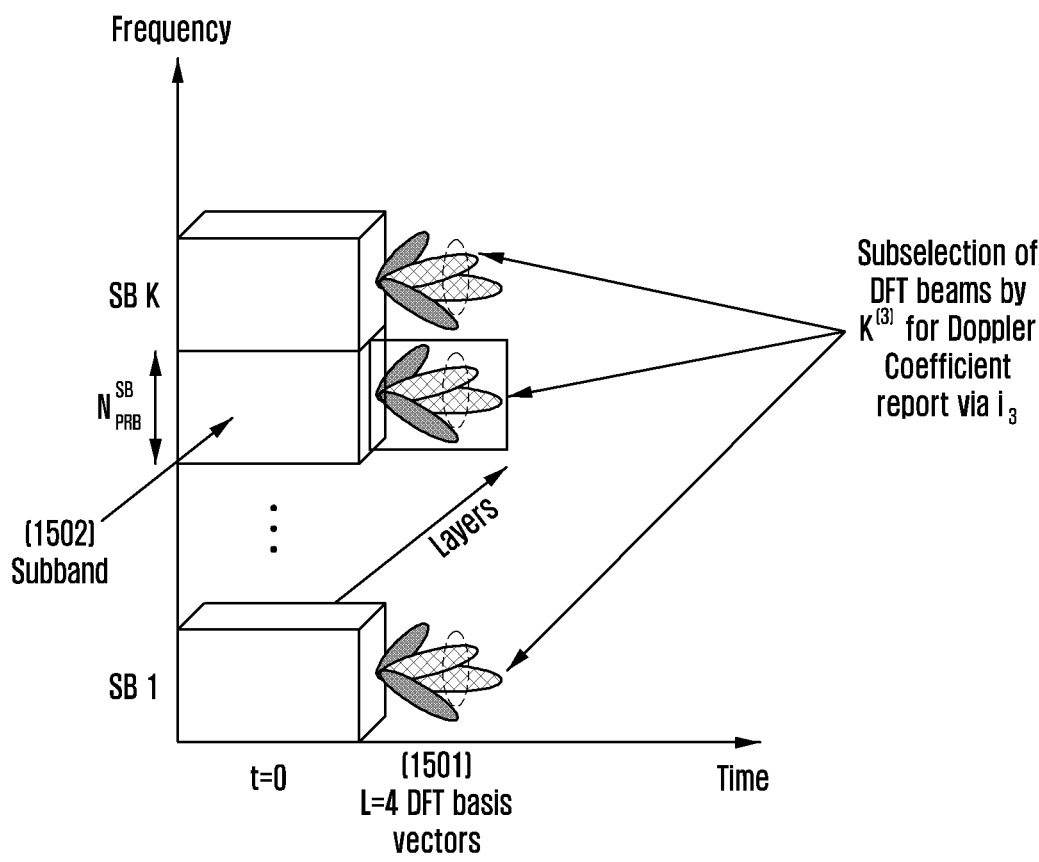
Figure 16:
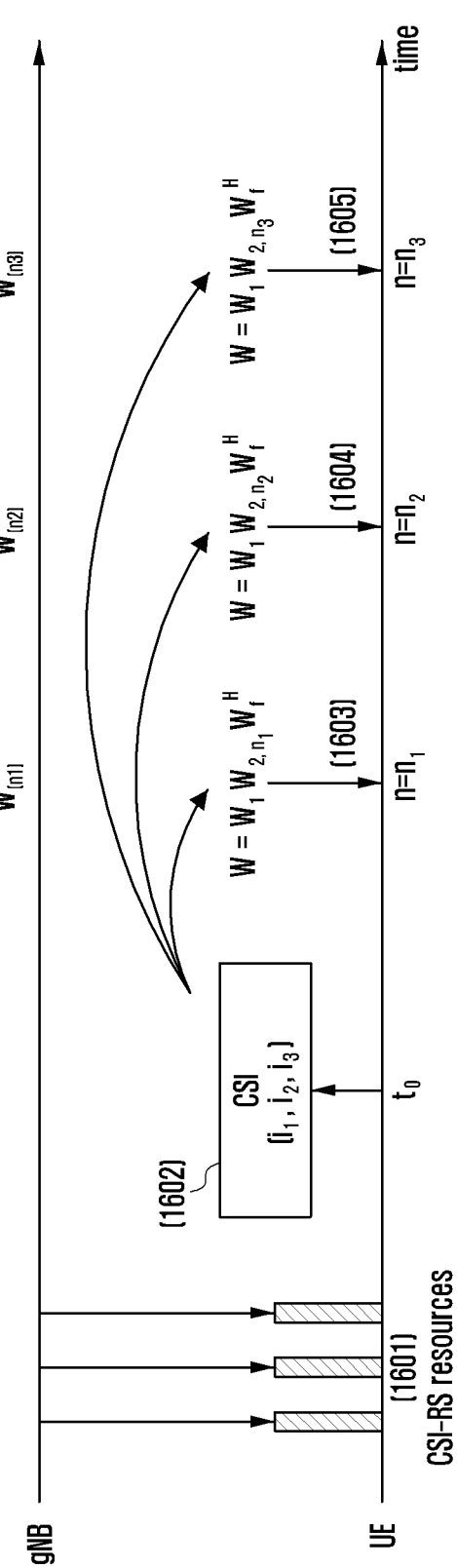
Figure 17:
Figure 18:
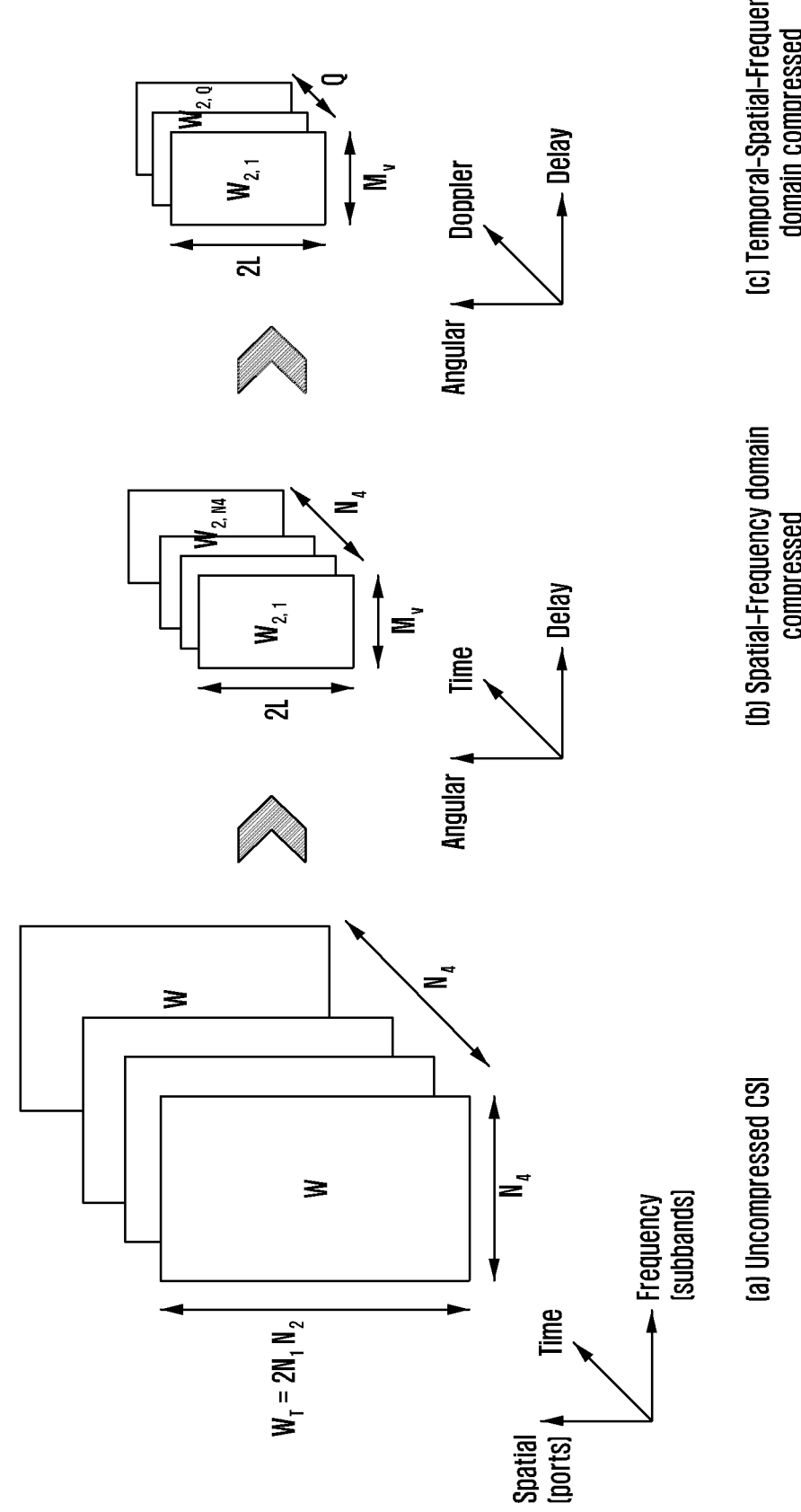
Figure 20:
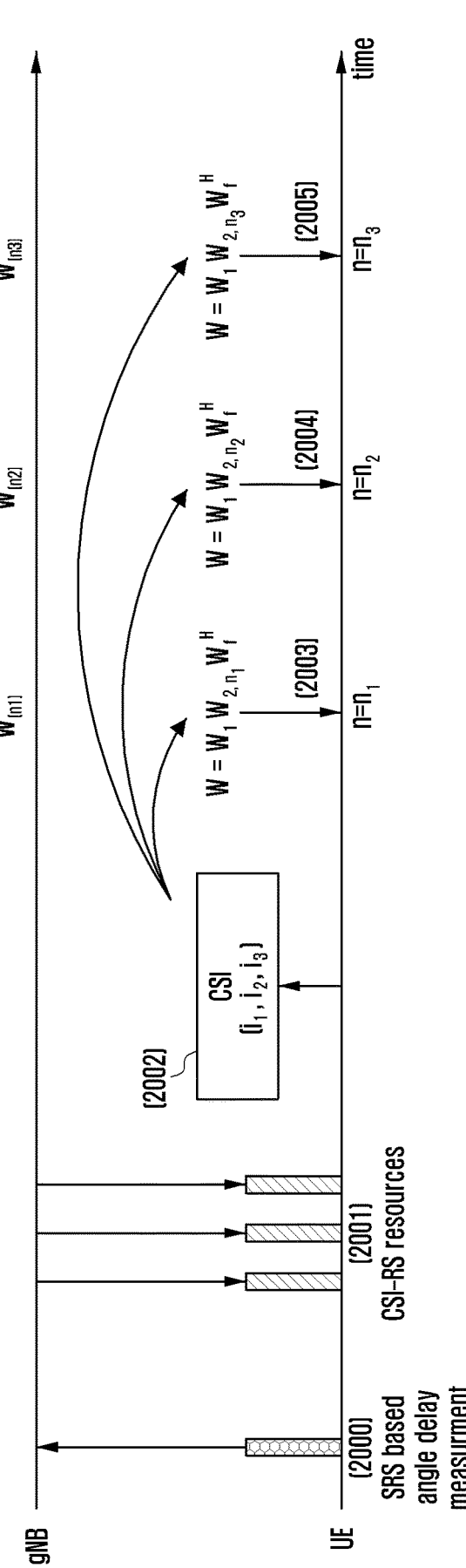
Figure 21:
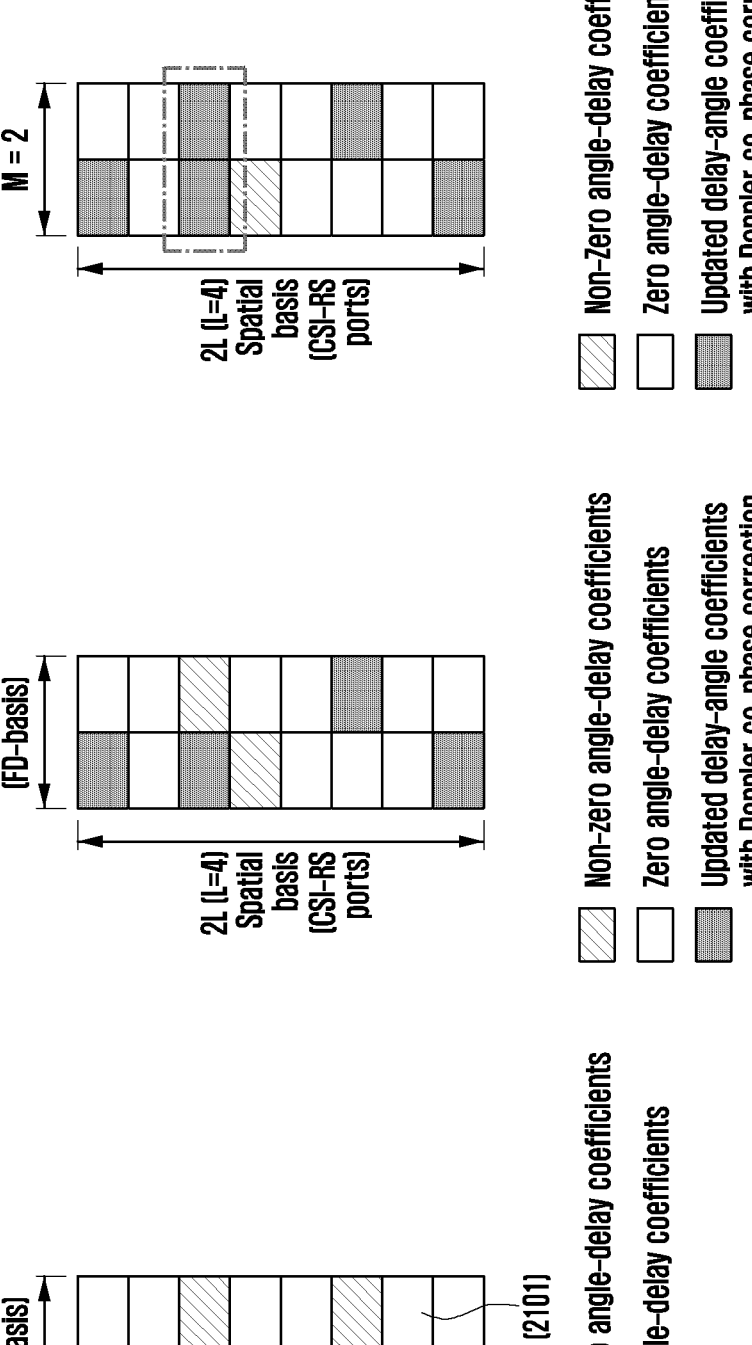

FIG. 10B illustrates another Doppler estimation block at the UE according to an embodiment of the disclosure;

FIG. 11 illustrates a process for channel Doppler estimation according to an embodiment of the disclosure;

FIG. 12 illustrates a message exchange and signaling for UE capability reporting and radio resource control (RRC) configuration to enable time-correlated CSI reporting according to an embodiment of the disclosure;

FIG. 13 illustrates a time-correlated CSI reporting for Type I CSI according to an embodiment of the disclosure;

FIG. 14 illustrates another time-correlated CSI reporting for Type II CSI with Doppler co-phasing correction coefficients according to an embodiment of the disclosure;

FIG. 15 illustrates another time-correlated CSI reporting with subset of spatial basis according to an embodiment of the disclosure;

FIG. 16 illustrates another time-correlated CSI reporting for enhanced Type II CSI with Doppler frequency shift coefficients according to an embodiment of the disclosure;

FIG. 17 illustrates FD-basis specific and FD-basis common reporting of Doppler frequency shift coefficients for enhanced Type II CSI according to an embodiment of the disclosure;

FIG. 18 illustrates a time-correlated CSI reporting based on Doppler domain compression and reporting configuration according to an embodiment of the disclosure;

Figure 19:
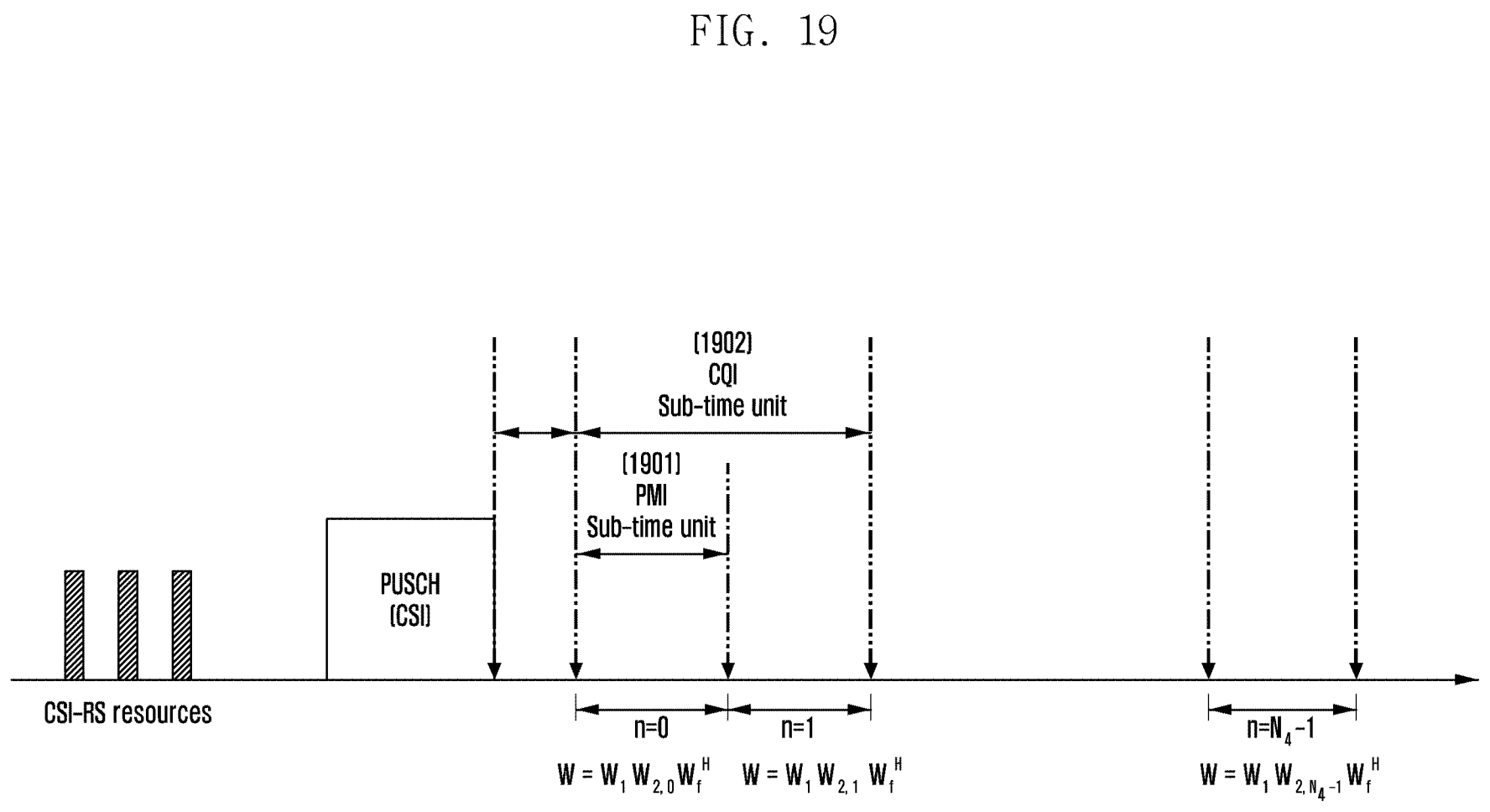

FIG. 19 illustrates a time-correlated CSI reporting based on CQI reporting configuration according to an embodiment of the disclosure;

FIG. 20 illustrates another time-correlated CSI reporting for Further enhanced Type II CSI with Doppler frequency shift coefficients according to an embodiment of the disclosure; And FIG. 21 illustrates FD-basis specific and FD-basis common reporting of Doppler co-phasing correction coefficients for further enhanced Type II CSI according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems, and to enable various vertical applications, 5G communication systems have been developed and are currently being deployed.

The 5G communication system is considered to be implemented to include higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. Aspects of the disclosure may be applied to deployment of 5G communication systems, 6G or even later releases which may use THz bands. To decrease propagation loss of the radio waves and increase the transmission distance, the beamforming, massive multiple-input multiple-output (MIMO), Full Dimensional MIMO (FD-MIMO), array antenna, an analog beam forming, large-scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

Figure 1:
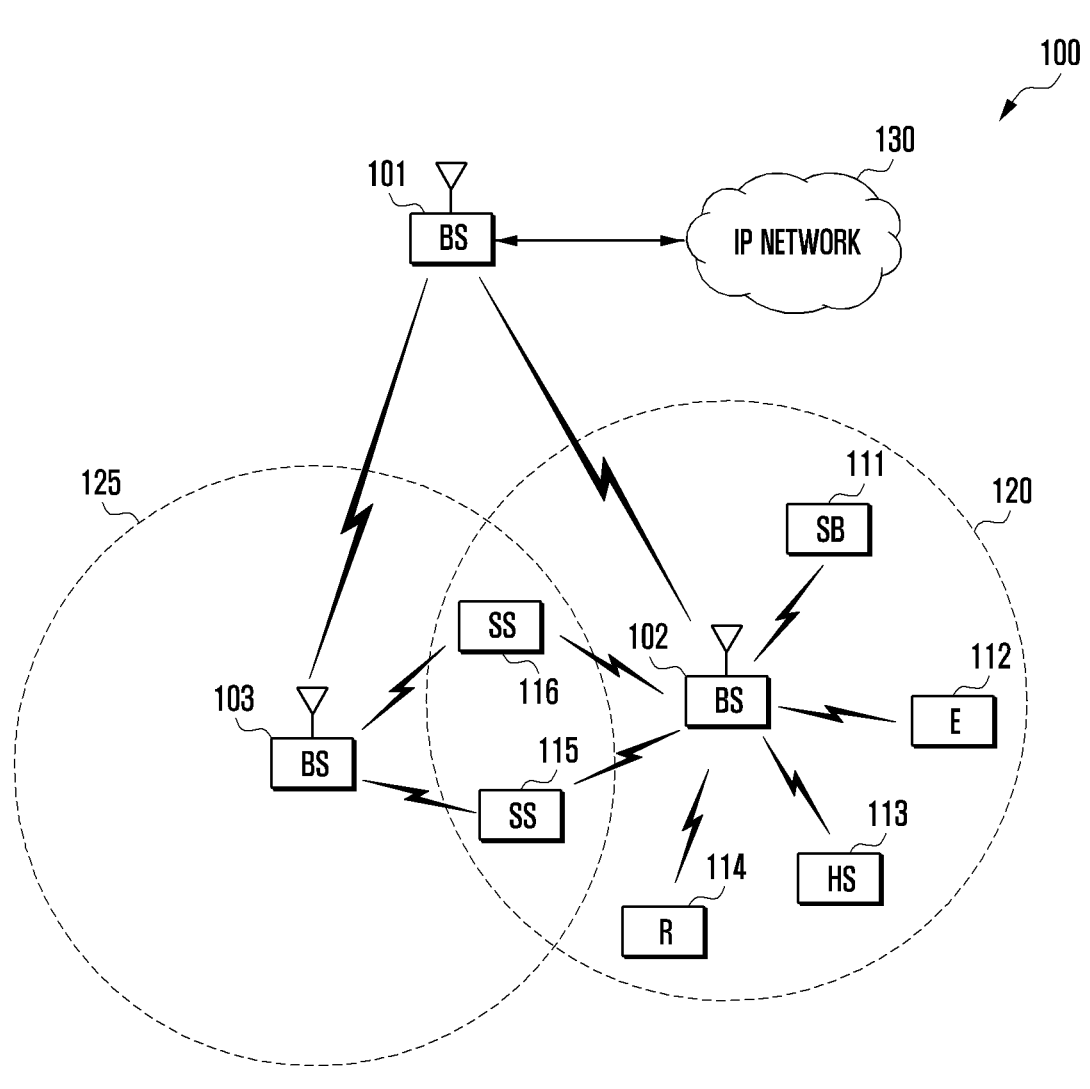
FIG. 1 illustrates an example wireless network according to an embodiment of the disclosure.

FIG. 1 illustrates an example wireless network 100 according to an embodiment of the disclosure. The embodiment of the wireless network 100 shown in FIG. 1 is for illustration only. Other embodiments of the wireless network 100 can be used without departing from the scope of this disclosure.

The wireless network 100 includes an gNodeB (gNB) 101, an gNB 102, and an gNB 103. The gNB 101 communicates with the gNB 102 and the gNB 103. The gNB 101 also communicates with at least one Internet Protocol (IP) network 130, such as the Internet, a proprietary IP network, or other data network.

Depending on the network type, the term 'gNB' can refer to any component (or collection of components) configured to provide remote terminals with wireless access to a network, such as base transceiver station, a radio base station, transmit point (TP), transmit-receive point (TRP), a ground gateway, an airborne gNB, a satellite system, mobile base station, a macrocell, a femtocell, a wireless fidelity (Wi-Fi) access point (AP) and the like. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to equipment that wirelessly accesses a gNB. The UE could be a mobile device or a stationary device. For example, UE could be a mobile telephone, smartphone, monitoring device, alarm device, fleet management device, asset tracking device, automobile, desktop computer, entertainment device, infotainment device, vending machine, electricity meter, water meter, gas meter, security device, sensor device, appliance etc.

The gNB 102 provides wireless broadband access to the network 130 for a first plurality of user equipments (Ues) within a coverage area 120 of the gNB 102. The first plurality of Ues includes a UE 111, which may be located in a small business (SB); a UE 112, which may be located in an enterprise (E); a UE 113, which may be located in a Wi-Fi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of Ues within a coverage area 125 of the gNB 103. The second plurality of Ues includes the UE 115 and the UE 116. In some embodiments, one or more of the gNBs 101-103 may communicate with each other and with the Ues 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include 2D antenna arrays as described in embodiments of the disclosure. In some embodiments, one or more of gNB 101, gNB 102 and gNB 103 support the codebook design and structure for systems having 2D antenna arrays.

Although FIG. 1 illustrates one example of a wireless network 100, various changes may be made to FIG. 1. For example, the wireless network 100 can include any number of gNBs and any number of Ues in any suitable arrangement. Also, the gNB 101 can communicate directly with any number of Ues and provide those Ues with wireless broadband access to the network 130. Similarly, each gNB 102-103 can communicate directly with the network 130 and provide Ues with direct wireless broadband access to the network 130. Further, the gNB 101, 102, and/or 103 can provide access to other or additional external networks, such as external telephone networks or other types of data networks.

Figure 2A:
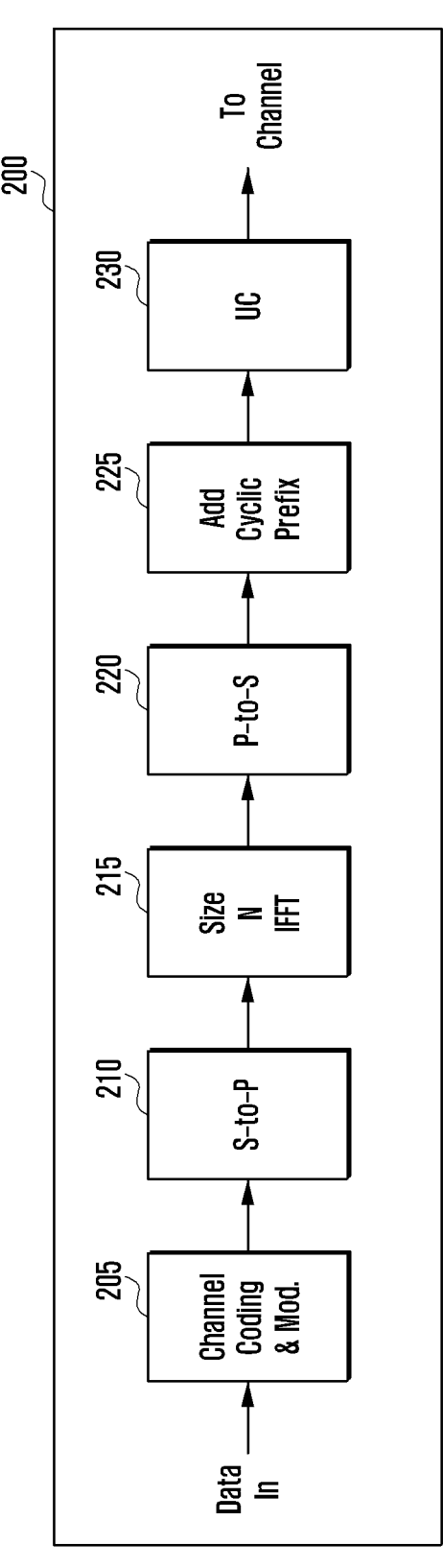
FIG. 2A illustrates example wireless transmit path according to an embodiment of the disclosure.
Figure 2B:
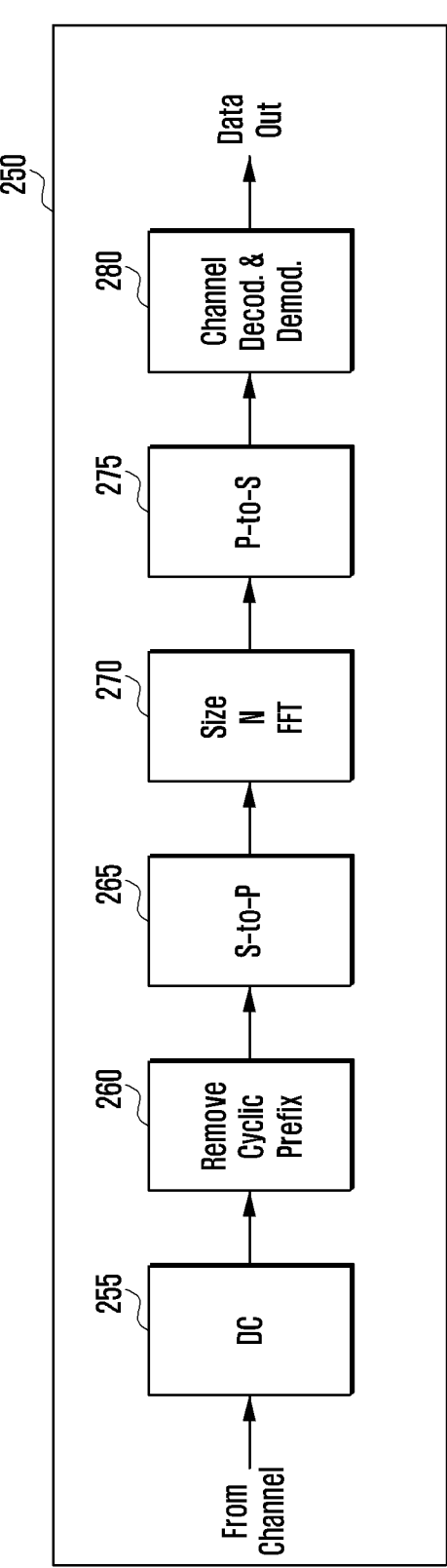
FIG. 2B illustrates example wireless receive path according to an embodiment of the disclosure.

FIGS. 2A and 2B illustrate example wireless transmit and receive paths according to various embodiments of the disclosure. In the following description, a transmit path 200 may be described as being implemented in an gNB (such as gNB 102), while a receive path 250 may be described as being implemented in a UE (such as UE 116). However, it will be understood that the receive path 250 can be implemented in an gNB and that the transmit path 200 can be implemented in a UE. In some embodiments, the receive path 250 is configured to support the codebook design and structure for systems having 2D antenna arrays as described in embodiments of the disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the gNBs 101-103 may implement a transmit path 200 that is analogous to transmitting in the downlink to Ues 111-116 and may implement a receive path 250 that is analogous to receiving in the uplink from Ues 111-116. Similarly, each of Ues 111-116 may implement a transmit path 200 for transmitting in the uplink to gNBs 101-103 and may implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B can be combined, further subdivided, or omitted and additional components can be added according to particular needs. Also, FIGS. 2A and 2B are meant to illustrate examples of the types of transmit and receive paths that can be used in a wireless network. Any other suitable architectures can be used to support wireless communications in a wireless network.

Figure 3A:
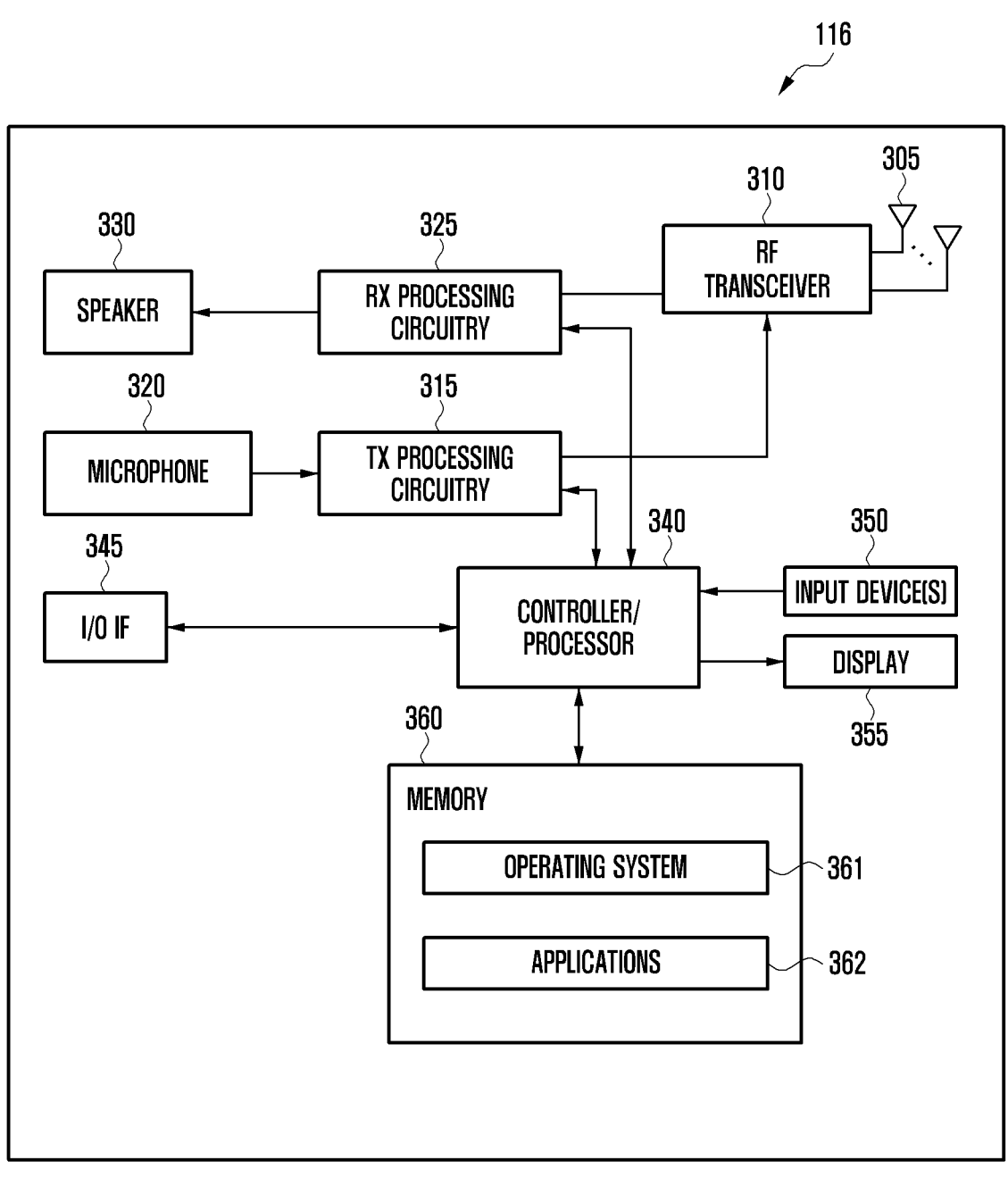
FIG. 3A illustrates an example UE according to an embodiment of the disclosure.

FIG. 3A illustrates an example UE 116 according to an embodiment of the disclosure. The embodiment of the UE 116 illustrated in FIG. 3A is for illustration only, and the Ues 111-115 of FIG. 1 can have the same or similar configuration. However, Ues come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 can control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the disclosure as described in embodiments of the disclosure. The main processor 340 can move data into or out of the memory 360 as required by an executing process. In some embodiments, the main processor 340 is configured to execute the applications 362 based on the OS program 361 or in response to signals received from gNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display 355. The operator of the UE 116 can use the keypad 350 to enter data into the UE 116. The display 355 may be a liquid crystal display or other display capable of rendering text and/or at least limited graphics, such as from web sites. The memory 360 is coupled to the main processor 340. Part of the memory 360 can include a random access memory (RAM), and another part of the memory 360 can include a Flash memory or other read-only memory (ROM).

Although FIG. 3A illustrates one example of UE 116, various changes may be made to FIG. 3A. For example, various components in FIG. 3A can be combined, further subdivided, or omitted and additional components can be added according to particular needs. As a particular example, the main processor 340 can be divided into multiple processors, such as one or more central processing units (CPUs) and one or more graphics processing units (GPUs). Also, while FIG. 3A illustrates the UE 116 configured as a mobile telephone or smartphone, Ues can be configured to operate as other types of mobile or stationary devices.

Figure 3B:
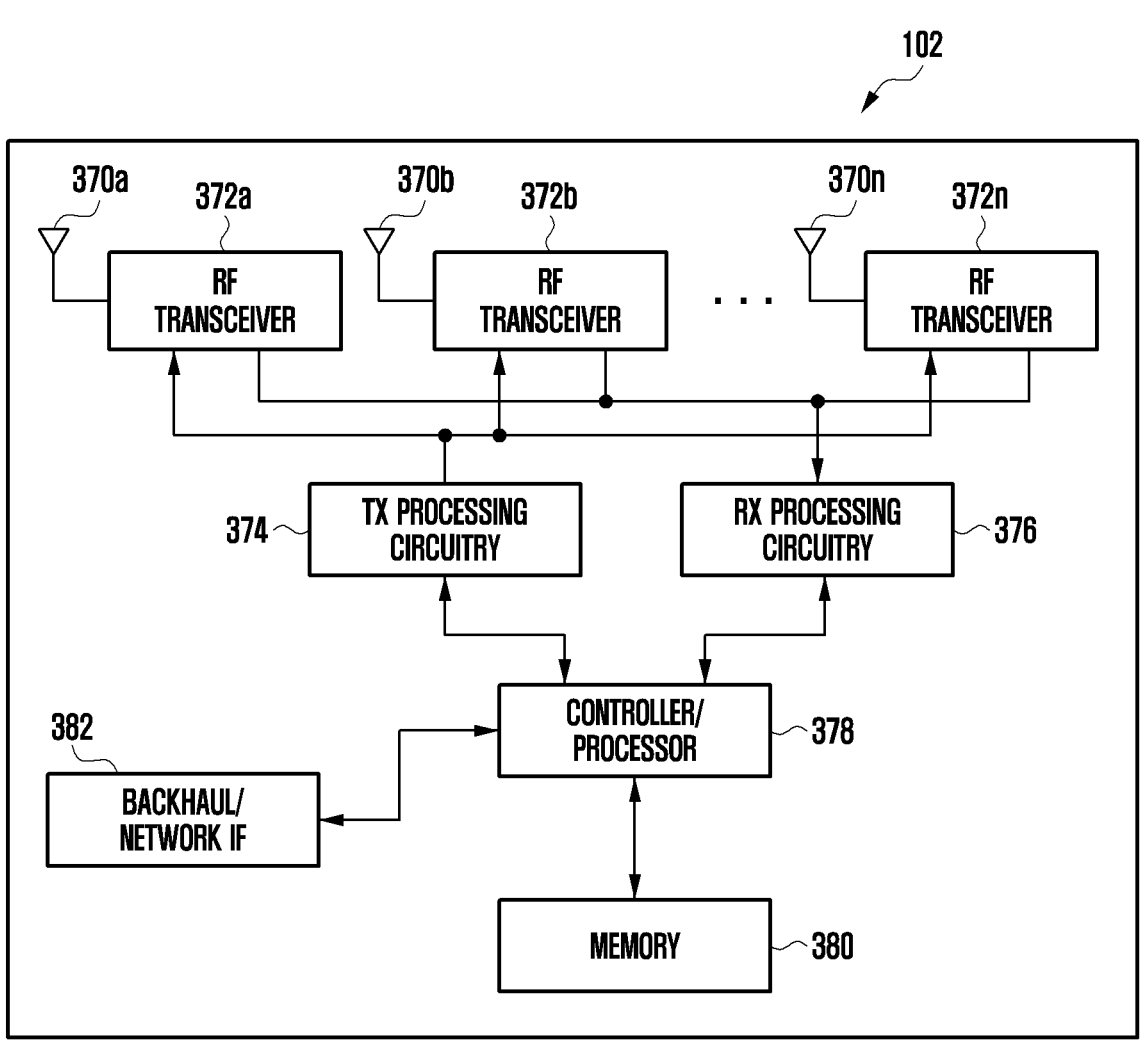
FIG. 3B illustrates an example gNB according to an embodiment of the disclosure.

FIG. 3B illustrates an example gNB 102 according to an embodiment of the disclosure. The embodiment of the gNB 102 shown in FIG. 3B is for illustration only, and other gNBs of FIG. 1 can have the same or similar configuration. However, gNBs come in a wide variety of configurations, and FIG. 3B does not limit the scope of this disclosure to any particular implementation of an gNB. It is noted that gNB 101 and gNB 103 can include the same or similar structure as gNB 102.

Referring to FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by Ues or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions can be supported in the gNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for systems having 2D antenna arrays as described in embodiments of the disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The interface 382 can support communications over any suitable wired or wireless connection(s). For example, when the gNB 102 is implemented as part of a cellular communication system (such as one supporting 5G, LTE, or LTE-A), the interface 382 can allow the gNB 102 to communicate with other gNBs over a wired or wireless backhaul connection. When the gNB 102 is implemented as an access point, the interface 382 can allow the gNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 can include a RAM, and another part of the memory 380 can include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) support communication with aggregation of FDD cells and TDD cells.

Although FIG. 3B illustrates one example of an gNB 102, various changes may be made to FIG. 3B. For example, the gNB 102 can include any number of each component shown in FIG. 3. As a particular example, an access point can include a number of interfaces 382, and the controller/ processor 378 can support routing functions to route data between different network addresses. As another particular example, while shown as including a single instance of TX processing circuitry 374 and a single instance of RX processing circuitry 376, the gNB 102 can include multiple instances of each (such as one per RF transceiver).

Figure 4:
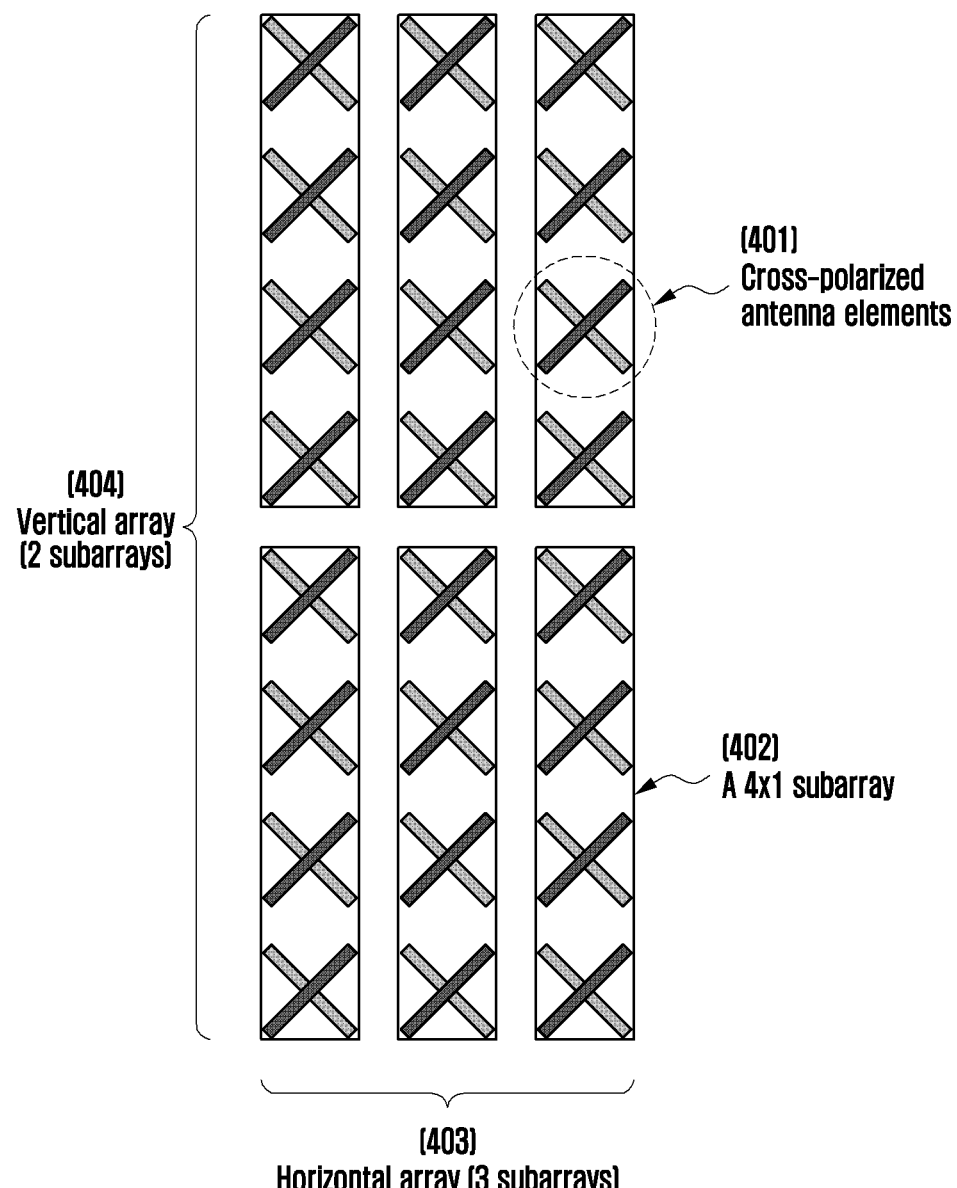
FIG. 4 illustrates cross-polarized MIMO antenna system according to an embodiment of the disclosure.

Multiple input multiple output (MIMO) system wherein a BS and/or a UE is equipped with multiple antennas has been widely employed in wireless systems for its advantages in terms of spatial multiplexing, diversity gain and array gain. FIG. 4 illustrates an example of MIMO antenna configuration with 48 antenna elements according to an embodiment of the disclosure. In the figure, 4 cross-polarized 401 antenna elements form a 4×1 subarray (402). 12 subarrays form a 2V3H MIMO antennas configuration consisting 2 and 3 subarrays in vertical (404) and horizontal (403) dimensions, respectively. Although FIG. 4 illustrates one example of MIMO antenna configuration, the disclosed disclosure can be applied to various such configurations.

In MIMO systems, the channel state information (CSI) is required at the base station (BS) so that a signal from the BS is received at the UE with maximum possible received power and minimum possible interference. The acquisition of CSI at the BS can be via a measurement at the BS from an UL reference signal or via a measurement and feedback by the UE from a DL reference signal for time-domain duplexing (TDD) and frequency-domain duplexing (FDD) systems, respectively. In 5G FDD systems, the channel state information reference signal (CSI-RS) is the primary reference signal that is used by the UE to measure and report CSI.

Figure 5:
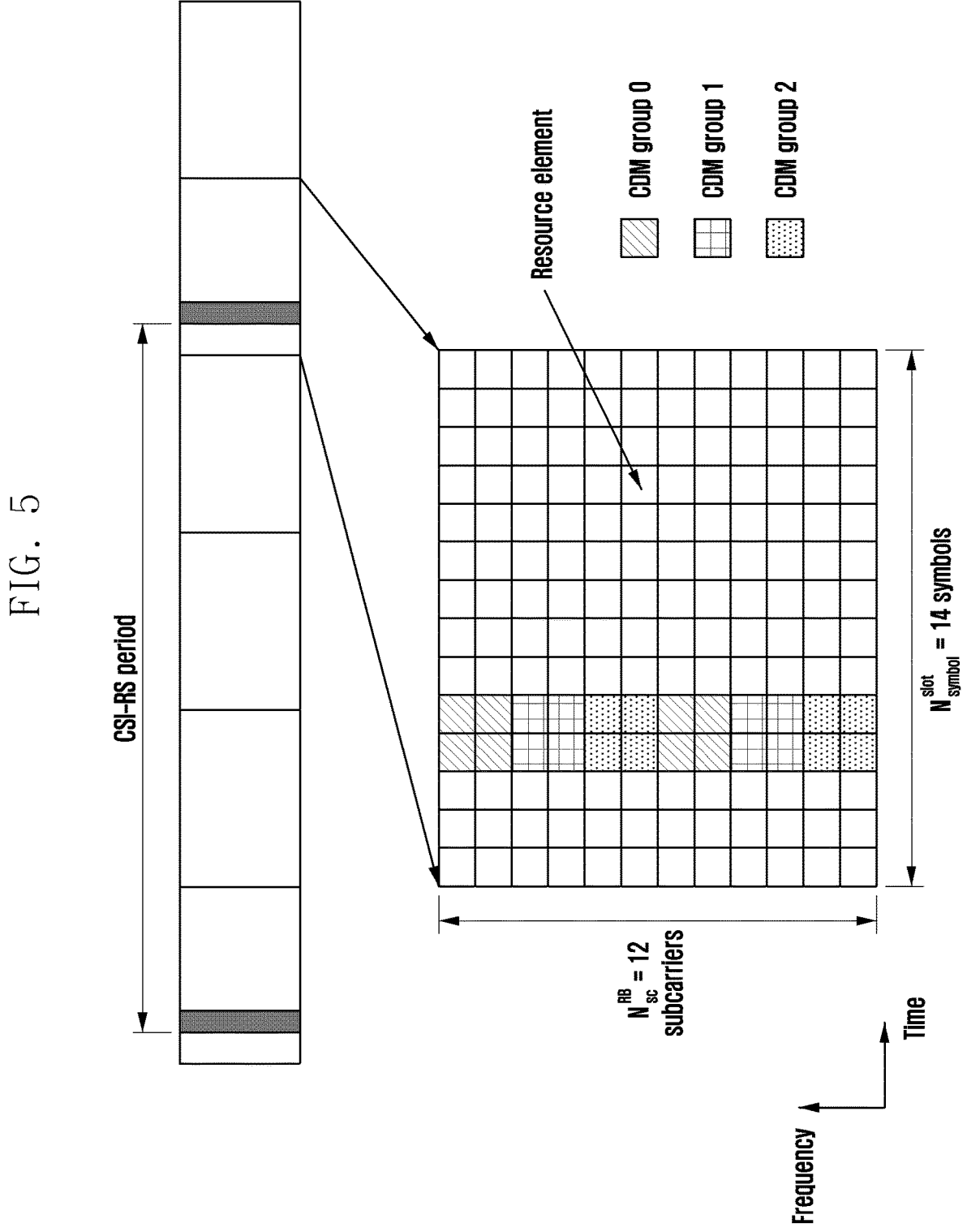
FIG. 5 illustrates layout for channel state information reference signal (CSI-RS) resource mapping in an orthogonal frequency division multiple access (OFDM) time-frequency grid according to an embodiment of the disclosure.

FIG. 5 illustrates layout for channel state information reference signal (CSI-RS) resource mapping in an orthogonal frequency division multiple access (OFDM) time-frequency grid according to an embodiment of the disclosure.

In some embodiments, a UE may receive a configuration signaling from a BS for a CSI-RS that can be used for channel measurement. An example of such configuration is illustrated in FIG. 5. In the figure, 12 antenna ports (CSI-RS ports) are mapped to a CSI-RS with 3 code-domain multiplexing (CDM) groups, wherein each CDM group is mapped to 4 resource elements (REs) in OFDM time-frequency grid. The antenna ports that are mapped to the same CDM group can be orthogonalized in code-domain by employing orthogonal cover codes. The CSI-RS configuration in FIG. 5 can be related to the MIMO antenna configuration in FIG. 4, by mapping a CSI-RS port to one of the polarization of a subarray. In the 5G NR standards, three time-domain configurations, namely: periodic, semi-persistent and aperiodic are possible. In the figure, an illustrative example of periodic configuration is given with a period of 4 slots.

Figure 6:
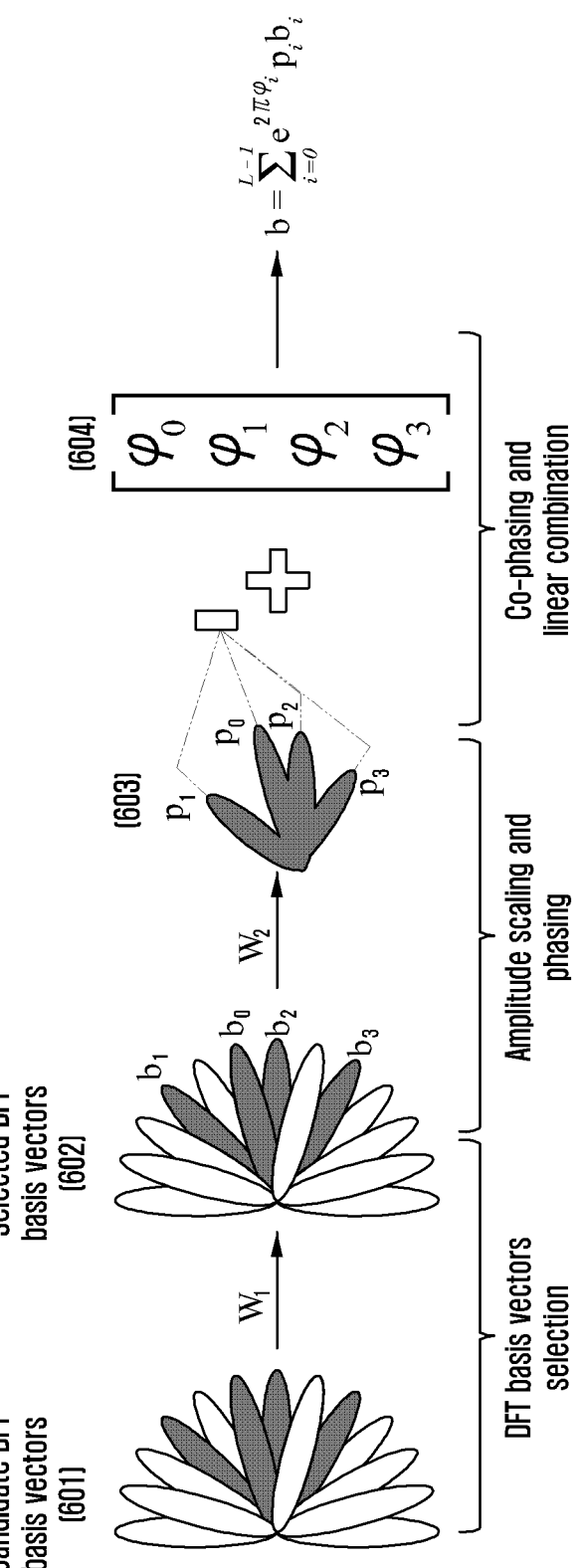
FIG. 6 illustrates an example of precoder construction in Type II CSI according to an embodiment of the disclosure.

In some embodiments, the BS is capable of configuring a UE, by a higher layer signaling, with information for a CSI feedback that may include spatial channel information indicator and other supplementary information that would help the BS to have an accurate CSI. The spatial channel indicator, which is reported via a precoding matrix indicator (PMI) in 4G and 5G specifications, comprises a single or a plurality of channel matrix, the channel covariance matrix, the eigenvectors, or spatial sampling basis vectors. In particular, in 4G and 5G specification, the spatial channel information can be given by a single or a plurality of discrete Fourier transform (DFT) basis vectors. FIG. 6 illustrates an example of CSI feedback based on a plurality of DFT basis vectors for what is known as Type II CSI in 5G NR according to an embodiment of the disclosure. The spatial information of the channel is reported in terms of L=4 DFT basis vectors $\{b_0, b_1, b_2, b_3\}$ 602 from a set of candidate DFT basis vectors 601. Additionally, amplitude information $\{p_0, p_1, p_2, p_3\}$ 603 and co-phasing information $\{\varphi_0, \varphi_1, \varphi_2, \varphi_3\}$ (604) are reported. Thus, in Type II CSI a dual-stage precoding matrix is given as $W=W_1 W_2$, where, $W_1$ select the DFT basis vectors and $W_2$ assign amplitude and co-phasing coefficients. Furthermore, a codebook can be defined as superset of candidate DFT basis vectors as well as candidate amplitude and phase coefficients. Then, a reported PMI would consist of indicators to the elements of a codebook that can represent the estimated channel.

In one embodiment, amplitude and phase information are reported in such a way that the linear combination of the basis vectors, i.e., $$b = \sum_{i=0}^{L-1} e^{2\pi \varphi_i} p_i b_i,$$

is matched to the eigenvector direction of the channel. Specifically, for a channel matrix H with the (s,u)-th element $h_{s,u}$ representing the channel gain between the s-th transmit and the u-th receive antenna, the eigenvectors of the covariance matrix $H^H H$ can be considered. Let $e_l$ denote one of the eigenvectors, then the PMI can be selected by the UE in such a way that the value $$\|e_l^H b\|$$

is maximized.

Moreover, a UE can be configured in different ways to report a tuple of DFT basis vectors, amplitude coefficients and the phase coefficients, based on polarization-common or polarization-specific manner. For example, in 5G NR specifications, DFT basis vectors are reported in a polarization-common manner while phase and amplitude coefficients are reported in polarization specific manner, i.e., reported per polarization. MIMO systems allow spatial multiplexing, i.e., transmission of data in multiple transmission layers. In this regard, the type II CSI in the 5G NR allows the DFT basis vectors to be reported in a layer-common manner, i.e., common basis for all layers, while phase and amplitude coefficients to be reported in a layer-specific manner.

Figure 7A:
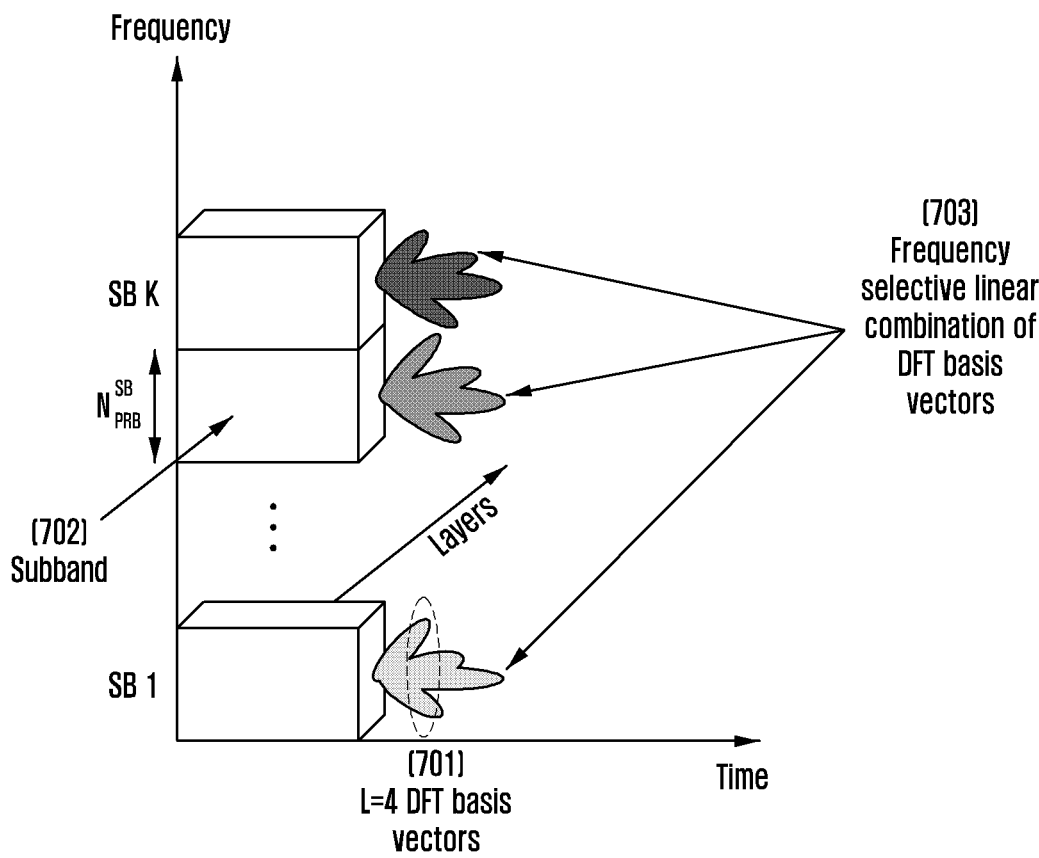
FIG. 7A illustrates reporting precoding matrices in subband granularity according to an embodiment of the disclosure.

In order to account for the frequency-selectivity of a wideband channel, some embodiments allow various components of the precoding matrix, i.e., components of PMI, to be reported per frequency ranges. In some configurations, the frequency band the UE is configured for DL reception, referred as DL bandwidth part (DL BWP), is partitioned into a set of subbands and the amplitude and/or phases coefficients are reported per a subband manner. In particular, the DL BWP can be partitioned in to subbands with subband size $$N_{PRB}^{SB}$$

physical resource blocks (PRBs). Then the selected DFT basis vectors 701 are linearly combined with different weights so that the resulting vector is aligned to the eigenvector of the channel in that subband. Denoting the set of subcarriers in the k-th subband as $F_k$, then the eigenvectors of the averaged covariance matrix $$C_k = \frac{1}{|F_k|} = \sum_{f \in F_k} \left( (H_{f,k})^H (H_{f,k}) \right)$$

can be considered, where, $f \in F_k$ are subcarriers in the k-th subband and $H_{f,k}$ is the corresponding channel matrix. FIG. 7A illustrates an example for frequency selective linear combination of DFT basis vectors 703 for K subbands of size $$N_{PRB}^{SB} 702.$$

Figure 7B:
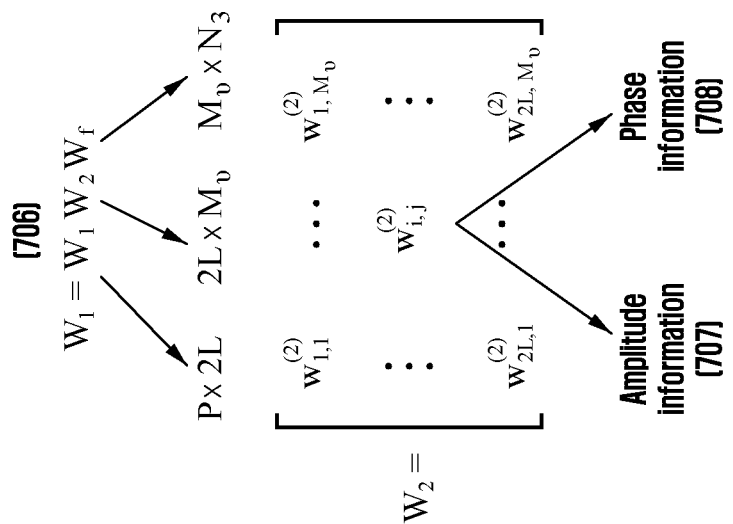
FIG. 7B illustrates a precoding matrix construction for enhanced Type II CSI according to an embodiment of the disclosure.
Figure 7B:
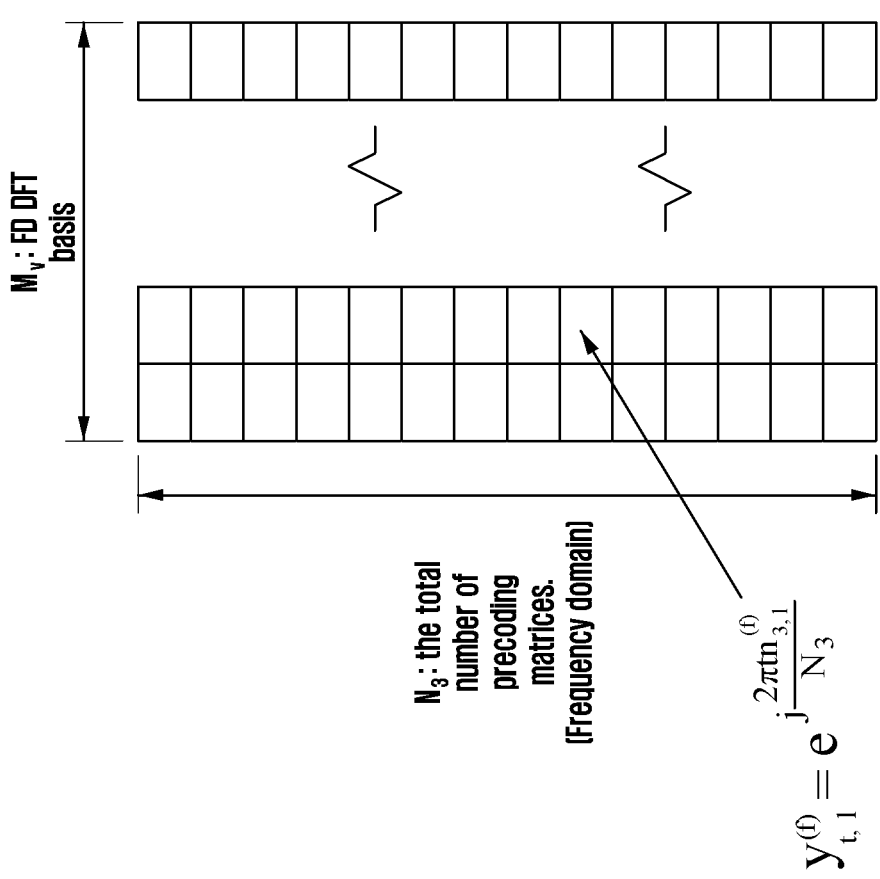

In 5G NR specifications, another configuration, known as enhanced Type II (eType II) CSI, allows reporting amplitude and phase coefficients in a delay-domain rather than per subband reporting in frequency-domain. This configuration reduces the feedback overhead as the delay components are usually much smaller than the equivalent number of sub-bands. In enhanced Type II codebook (eType II CB) (FIG. 7B), precoding matrices are reported in delay domain by employing frequency-domain (FD) DFT basis rather than the frequency domain reporting in Type II CSI (FIG. 7A), i.e., per subband or wideband. FIG. 7B illustrates construction of eType II CSI. In particular, a precoding matrix is expressed in three-stages $$W = W_1 W_2 W_f^H (706).$$

The spatial domain selection matrix $W_1$ selects L DFT vectors from $P=2N_1N_2$ CSI-RS ports, consequently, it has 2L rows accounting for the cross-polarized antennas. Moreover, an $M_v \times N_3$ matrix $$W_f^H$$

corresponds to $M_v$ DFT basis vectors that can transform the precoding matrix reported in delay domain for $M_v$ delay components to a frequency domain with $N_3$ frequency domain points (bins). In particular, the $t \in \{1, 2, \ldots, N_3\}$-th element of f-th vector is given by $$y_{t,l}^{(f)} = e^{j\frac{2\pi m_{3,l}^{(f)}}{N_3}}.$$

Finally, the matrix $W_2$ carries the amplitude and phase information wherein the i-th and j-th element, $w_{i,j}$, carries amplitude (707) and phase (708) information of i-th DFT beam and j-th delay component.

In order to further reduce the CSI overhead, a system may exploit angle-delay reciprocity and measure the dominant angle and delay components of a channel from an UL reference signal such as sounding reference signal (SRS). Then, a precoded CSI-RS can be considered for DL CSI measurement wherein the CSI-RS ports are mapped to an angle-delay component of the channel. Moreover, delay pre-compensation can be applied to the CSI ports so that the UE would measure CSI for a fewer number of delay components, i.e., in the extreme case for just one delay component.

One scenario of interest in wireless communication systems is supporting high and medium mobility Ues. Such mobility shortens the channel coherence time and makes the CSI measurement and feedback challenging.

Figure 8:
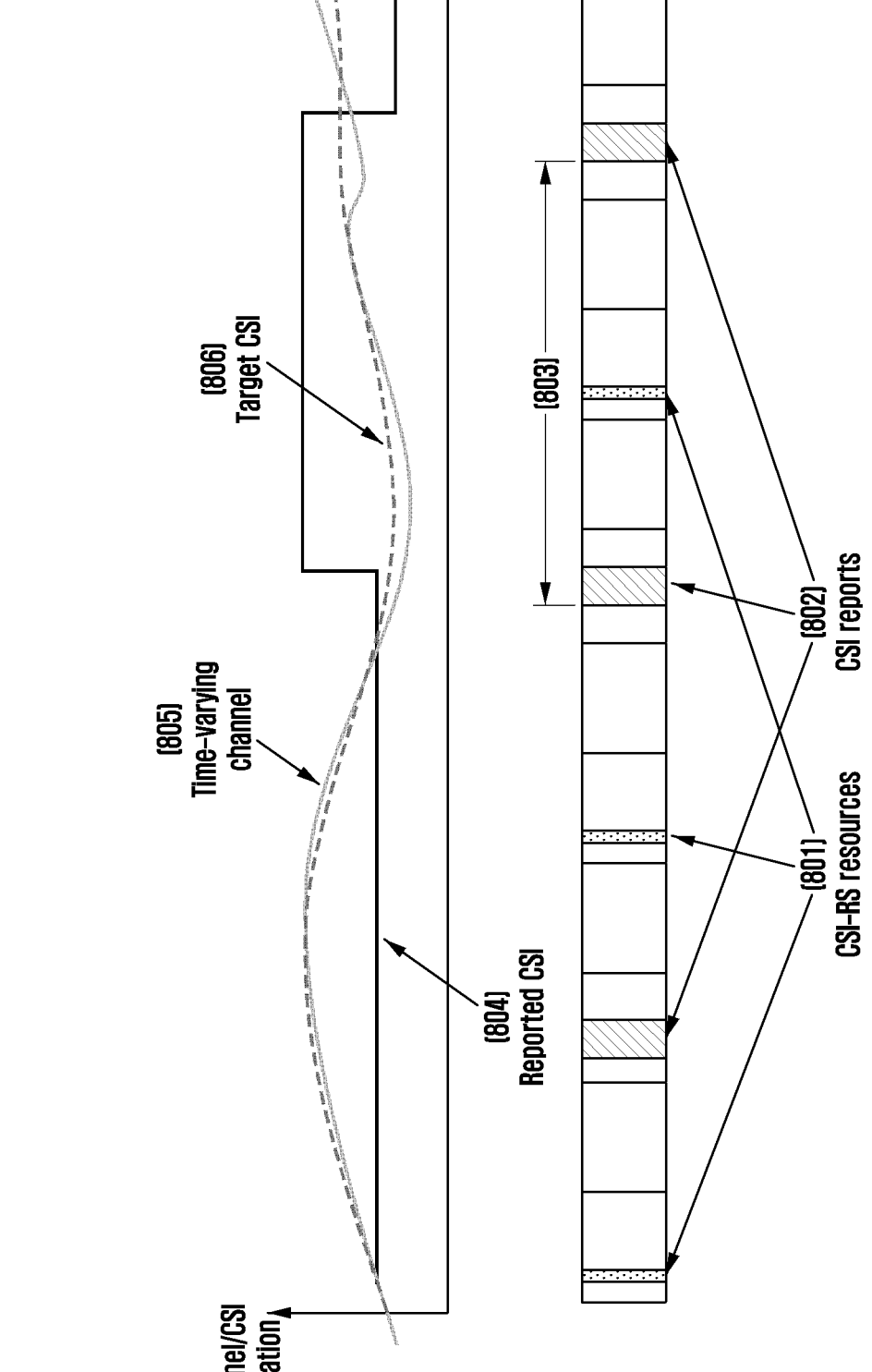
FIG. 8 illustrates channel aging in high and medium mobility scenario according to an embodiment of the disclosure.

FIG. 8 illustrates channel aging in high and medium mobility scenario according to an embodiment of the disclosure.

An illustration of an embodiment wherein a CSI measurement and feedback configuration is given by FIG. 8. In the figure a CSI measured from CSI-RSs 801 and reported with CSI reports 802 is illustrated. Moreover, the period between two CSI reports is indicated by 803. The CSI reports that aim at capturing the time-varying channel 805 and the CSI at the gNB can be represented by 804. In the example, it is apparent that there is a discrepancy between the actual time-varying channel 805 and the reported CSI 804. The error between the actual channel and the reported CSI may degrade the system performance and the phenomenon is referred as channel aging or CSI outdating.

To solve the channel aging, a method which enables a CSI to closely follow a time-varying channel as illustrated in 806 is required. One possible solution, to closely capture a time-varying channel, is to increase the measurement and reporting frequency. However, such solutions may not be feasible in some cases as the CSI processing delay between measurement and reporting remains to be a problem. Moreover, the frequent CSI measurement and feedback could also increase the CSI overhead, thus, reducing the efficiency of the wireless communication system.

The following documents and standards descriptions are hereby incorporated into the disclosure as if fully set forth herein:

A description of example embodiments is provided on the following pages.

The text and figures are provided solely as examples to aid the reader in understanding the disclosure. They are not intended and are not to be construed as limiting the scope of this disclosure in any manner. Although certain embodiments and examples have been provided, it will be apparent to those skilled in the art based on the disclosures herein that changes in the embodiments and examples shown may be made without departing from the scope of this disclosure.

The below flowcharts illustrate example methods that can be implemented in accordance with the principles of the disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

A typical wireless channel with multiple propagation paths can be modeled as $$H_{u,s}(t) = \sum_l A_{u,s,\tau_l}^{(l)} \exp\left( j\left( 2\pi f_{\tau_l}^{(l)}(t - \tau_l) + \phi_{u,s,\tau_l}^{(l)} \right) \right) \qquad \text{Equation 1}$$

where $H_{u,s}(t)$ is the channel gain between the u-th receive and s-th transmit antenna at time t. Moreover, $$A_{u,s,\tau_l}^{(l)}, \phi_{u,s,\tau_l}^{(l)}, \text{ and } f_{\tau_l}^{(l)}$$

denote the amplitude, phase and Doppler coefficients associated with the l-th propagation path, respectively. The l-th propagation path is associated with a delay $T_1$. According to the channel model in (1), the time-variation of the channel is a result of the Doppler components. In the 4G and 5G specifications, while a UE measures and reports CSI, it implicitly assumes the Doppler coefficients (frequencies) to be zero, hence, the CSI reports contain only amplitude and phase information for angular (spatial) and delay (frequency) components of a channel.

Figure 9:
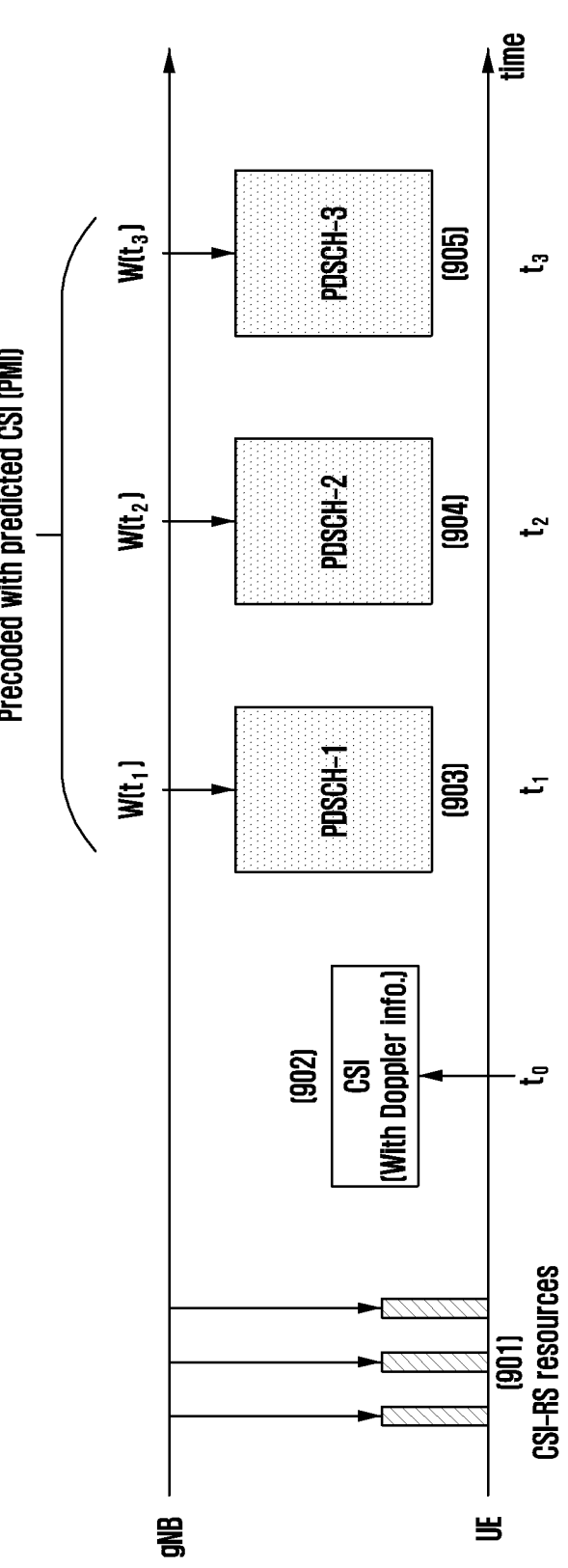
FIG. 9 depicts an embodiment for disclosure wherein a UE reports multiple CSI that can be applied to multiple application time according to an embodiment of the disclosure.

FIG. 9 depicts an embodiment for disclosure wherein a UE reports multiple CSI that can be applied to multiple application time according to an embodiment of the disclosure.

In some embodiments of the disclosure, an RX processing unit 325 of a UE is capable of measuring the Doppler coefficients. In this case, the UE may report a CSI which contains Doppler information as well as amplitude and phase information in legacy CSI. This is typically important in the medium/high mobility scenarios where the Doppler frequency cannot be ignored. In one embodiment of the disclosure, such as the one illustrated in FIG. 9, a UE may derive the Doppler information in 902 from channel estimation based on at least one CSI-RS resources (901) where the reported CSI may contain Doppler information as well as the spatial, amplitude and phase information in legacy CSI. Then the gNB may predict the CSI at a future distinct times where the PDSCH is scheduled (903)-(905).

Another important consideration for time-varying CSI reporting is the reference time the UE and gNB consider while deriving the CSI and constructing precoders. In some embodiments the reference time (t=0), can be specified/configured as the last OFDM symbol for a PUSCH/PUCCH that carries the time-varying CSI. Another possible consideration is to specify/configure the reference time (t=0) as the first symbol of slot that comes after the slot that the PUCCH/PUSCH resources that carries the time-varying CSI. A yet another consideration for reference time for measuring time-varying CSI is the last OFDM symbol for the last CSI-RS resource that used to derive the time-varying CSI.

FIGS. 10A and 10B provide an illustration of one possible realization according to various embodiments of the disclosure. In the figure, a channel estimation and prediction unit 1000 located inside the UE uses one or more CSI-RS resources 1001 to derive a CSI report with Doppler information. In one realization, M CSI-RS resources in 1001 are received by the UE at different times. Based on the CSI report with Doppler information, the gNB 1003 can then generate time-varying precoder W(t). Two realizations for the disclosure are illustrated in FIGS. 10A and 10B. In FIG. 10A, the UE reports a reference CSI {W} based on legacy codebooks and the Doppler information {f} separately (1002). In a yet another realization, the Doppler information can be incorporated in the codebook design and the CSI report W={W,f} (1005) from the UE may include Doppler information.

FIG. 11 illustrates a process for channel Doppler estimation according to an embodiment of the disclosure.

One way to realize the channel estimation and prediction unit (1000) is illustrated in FIG. 11. A channel estimation subblock (1101) estimates multiple channel matrices {$H_1$, $H_2$, . . . , $H_M$} from M CSI-RS resources. The channel matrices are then decomposed (1102) either to eigenvector based precoders or to multi-path components as Equation 1 or a linear combination of DFT basis vectors in a similar manner as shown in FIG. 6. The subblock 1103 can then extract the Doppler components (frequencies) {f} based on the outputs of 1102. In this regard, various linear and nonlinear regression methods including curve-fitting methods can be used to extract the Doppler coefficients from Eigen channels taken at M time instants {$W_1, W_2, \ldots, W_M$}.

Yet another possible implementation of the channel estimation and prediction unit 1000 is based on artificial intelligence (AI). Exploiting their ability in performing non-linear optimization tasks (including regression functions) with low computational complexity, deep-learning (DL)-based methods may easily extract the Doppler information from channel measurement taken from M CSI-RS resources.

Part I: Resource and Report Configurations

FIG. 12 illustrates a message exchange and signaling for UE capability reporting and radio resource control (RRC) configuration to enable time-correlated CSI reporting according to an embodiment of the disclosure.

To enable a UE to estimate CSI feedbacks with Doppler information, the gNB may configure the UE with higher layer parameters. In FIG. 12 a message exchange in the disclosure is illustrated. A UE capability signaling 1200 may indicate to the gNB on the UE's capability of reporting a CSI with Doppler information from channel measurements taken from at least one or more CSI-RS resources.

Various embodiments of the disclosure can be considered wherein the UE capability reporting in 1200 may include the number of CSI-RS resource (M), the UE's capability to resolve and report multitude of Doppler coefficients per angular and/or delay domain, the maximum number of CSI-RS ports it can report Doppler information to.

The gNB then configures the UE with a higher layer configuration 1201 for resource and report configurations. As an example, the disclosure introduces a CSI report configuration wherein an introduced parameter timeCorrelatedCSI as shown below configures the UE to report CSI with Doppler information. The UE then may measure at least one or more CSI-RS resources for Doppler information estimation (1202). Moreover, the UE reports CSI with Doppler information (1203) based on similar process as described in FIG. 10A or 10B.

```
CSI-ReportConfig ::= SEQUENCE {
reportConfigId CSI-ReportConfigId,
carrier ServCellIndex OPTIONAL, -- Need S
resourcesForChannelMeasurement CSI-ResourceConfigId,
csi-IM-ResourcesForInterference CSI-ResourceConfigId
OPTIONAL, -- Need R
nzp-CSI-RS-ResourcesForInterference CSI-ResourceConfigId
OPTIONAL, -- Need R
reportConfigType CHOICE {
periodic SEQUENCE {
reportSlotConfig CSI-ReportPeriodicityAndOffset,
...
....
....
timeCorrelatedCSI    ENUMERATED {enabled}      OPTIONAL
```

Part II: CSI Reporting Based on Different Codebooks

Part II.1: Report Based on Type I CSI

In this subsection, the description of the disclosure is discussed with respect to Type I CSI in the 5G NR system. In Type I single panel codebook (Type I SP CB), a UE reports indicators $i_1$ and $i_2$. The UE may be configured with higher layer parameter codebookMode which can be set to either '1' or '2'.

When the codebookMode is set to '1', the indicator $i_1$ which may include sub-indicators $i_{1,1}$, $i_{1,2}$ and/or $i_{1,3}$, i.e., $i_1=\{i_{1,1}, i_{1,2}\}$ or $i_1=\{i_{1,1}, i_{1,2}, i_{1,3}\}$, where it indicates the spatial channel information. On the other hand, another indicator $i_2$ indicates co-phasing coefficient. The spatial channel information which includes a 2 dimensional (2D) DFT beam (spatial basis vector) is given as $$v_{l,m} = \left[ u_m \quad e^{j\frac{2\pi l}{O_1 N_1}} u_m \quad \ldots \quad e^{j\frac{2\pi m(N_1-1)}{O_1 N_1}} \right]^T \qquad \text{Equation 2}$$

$$\text{where } u_m = \begin{cases} \left[ 1 \quad e^{j\frac{2\pi m}{O_1 N_1}} u_m \quad \ldots \quad e^{j\frac{2\pi m(N_1-1)}{O_1 N_1}} \right]^T & N_2 \geq 1 \\ 0 & N_2 = 1 \end{cases}.$$

The antenna array dimensions $N_1$ and $N_2$ with the corresponding oversampling factors $O_1$ and $O_2$ are configured via higher layer parameters. The components of $i_1$, i.e., indicators $i_{1,1}$, $i_{1,2}$ or $i_{1,3}$ are mapped to the values l and m which may then be used to construct $v_{l,m}$. Moreover, a co-phasing information is indicated via indicator $i_2$ which is mapped to a value n that is in turn mapped to a co-phasing coefficient $\varphi_n=e^{j\pi n/2}$. The spatial and co-phasing information may then be used by the gNB to construct the precoder associate to a particular layer as $$\begin{bmatrix} v_{l,m} \\ \pm \varphi_n v_{l,m} \end{bmatrix}.$$

In one method, Method II.1., of the disclosure, a UE may derive a Doppler frequency coefficients {f} and report an indicator $i_3$ to indicate the measured Doppler information. In particular, when a UE is configured with higher layer parameter codebookType set to 'typeI-SinglePanel' and the parameter timeCorrelatedCSI in the CSI report configuration is enabled, each PMI value corresponds to a codebook indicators $i_1$, $i_2$, and $i_3$. The indicator $i_3$ can be mapped to a Doppler frequency $f_d$. The gNB then derives a Doppler coefficient $\phi(t)=e^{j2\pi f_d t}$ at a time t based on the reported Doppler frequency $f_d$. Then, the gNB may construct the precoder associate to a particular layer for a PDSCH transmission scheduled at time t as $$\begin{bmatrix} v_{l,m} \\ \pm \phi(t)\varphi_n v_{l,m} \end{bmatrix}.$$

FIG. 13 illustrates a time-correlated CSI reporting for Type I CSI according to an embodiment of the disclosure.

An illustration of embodiment II.1.1 is provided in FIG. 13. In the figure, the UE which is configured with a bundled CSI-RS resource(s) (1301) derives time correlated CSI (1302) report which contains a single spatial information indicator $i_1$, co-phasing indicators {$i_2$} and Doppler coefficient indicator $i_3$. Upon receiving the time correlated CSI report (1302), the gNB constructs the corresponding precoders (1303)-(1305) for the corresponding application time (times PDSCH transmissions are scheduled) t=1, 2, 3. In particular, for application time t the gNB may apply the precoder W(t) given in the form of $$\begin{bmatrix} v_{l,m} \\ \pm \phi(t)\varphi_n v_{l,m} \end{bmatrix}.$$

As a part of the disclosure, the mapping between the reported Doppler coefficient indicator and the Doppler frequency shift can be considered. In one Method, Method II.1.1 a multitude mapping Tables for Doppler coefficient indicator to Doppler frequency shift can be considered. Each table may then correspond to a distinct maximum Doppler frequency $F_{max}$. As an example, Tables 1A and 1B illustrate a 3-bit indicator $i_3$ for $F_{max}$ and $F_{max}$, respectively. The codepoint of the indicator $i_3$ can then be mapped to the value d in an increasing order, i.e., the codepoint 000 is mapped to 0, codepoint 001 to 1, and so on. Based on a specific Doppler value to Doppler frequency mapping table, the value d can be mapped to Doppler frequency shift value $f_d$.

TABLE 1A

| d | $f_d$ (Hz) |
|---|---|
| 0 | −200 |
| 1 | −150 |
| 2 | −100 |
| 3 | −50 |
| 4 | 50 |
| 5 | 100 |
| 6 | 150 |
| 7 | 200 |

TABLE 1B

| d | $f_d$ (Hz) |
|---|---|
| 0 | −500 |
| 1 | −250 |
| 2 | −125 |
| 3 | −100 |
| 4 | 125 |
| 5 | 250 |
| 6 | 375 |
| 7 | 500 |

As part of Method II.1.1., the gNB may indicate, via RRC or MAC-CE signaling, to the UE the mapping table for Doppler coefficient indicator to Doppler frequency shift. As an example, an RRC parameter dopplerMappingTable can be introduced which indicates to the UE the mapping Table to use upon reporting the time-varying CSI. This RRC parameter can be configured under codebookConfig as below.

```
CodebookConfig ::= SEQUENCE {
codebookType CHOICE {
•
•
•
type2 SEQUENCE {
subType CHOICE {
typeII SEQUENCE {
•
•
•
typeII-RI-Restriction BIT STRING (SIZE (2))
},
typeII-PortSelection SEQUENCE {
portSelectionSamplingSize ENUMERATED {n1, n2, n3, n4}
OPTIONAL, -- Need R
typeII-PortSelectionRI-Restriction BIT STRING (SIZE (2))
}
},
phaseAlphabetSize ENUMERATED {n4, n8},
subbandAmplitude BOOLEAN,
dopplerMappingTable ENUMERATED {table1, table2, table3,...}
OPTIONAL
```

In a yet another Method, Method II.1.2, a scalable mapping between Doppler coefficient indicator values to Doppler frequency shift can be considered. Moreover, the UE may receive a configuration from the gNB, about the maximum Doppler frequency $F_{max}$. As an example, Table 2 illustrate a 3-bit indicator $i_3$. The codepoint of the indicator can be mapped to the value d in an increasing order, i.e., the codepoint 000 is mapped to 0, codepoint 001 to 1, and so on. Then the value d can be mapped to Doppler frequency shift value $f_d$.

TABLE 2

| d | $f_d$ (Hz) |
|---|---|
| 0 | $-F_{max}$ |
| 1 | $-3/4\ F_{max}$ |
| 2 | $-1/2\ F_{max}$ |
| 3 | $-1/4\ F_{max}$ |
| 4 | $1/4\ F_{max}$ |
| 5 | $1/2\ F_{max}$ |
| 6 | $3/4\ F_{max}$ |
| 7 | $F_{max}$ |

As part of Method II.1.2, the gNB may indicate, via RRC or MAC-CE signaling, to the UE the maximum Doppler frequency shift. As an example, an RRC parameter maxDopplerShift can be introduced which indicates to the UE the maximum Doppler Frequency $F_{max}$ that can be used to map the value of Doppler coefficient indicator $i_3$ and Doppler frequency shift upon reporting the time-varying CSI. This RRC parameter can be configured under codebookConfig RRC IE as below.

```
CodebookConfig ::= SEQUENCE {
codebookType CHOICE {
•
•
•
type2 SEQUENCE {
subType CHOICE {
typeII SEQUENCE {
•
•
•
typeII-RI-Restriction BIT STRING (SIZE (2))
},
typeII-PortSelection SEQUENCE {
portSelectionSamplingSize ENUMERATED {n1, n2, n3, n4}
OPTIONAL, -- Need R
typeII-PortSelectionRI-Restriction BIT STRING (SIZE (2))
}
},
phaseAlphabetSize ENUMERATED {n4, n8},
subbandAmplitude BOOLEAN,
maxDopplerShift ENUMERATED (fmax1, fmax2, fmax3,...}
OPTIONAL
```

One may notice in Tables 1A, 1B and 2 that the Doppler coefficient indicator and the value associated to $f_d$=0 is not available. In the case wherein the UE is configured with an RRC parameter timeVaryingCSI and expected to report a Doppler information, if the estimated Doppler frequency shift is mapped to the value $f_d$=0, then the UE may not report the Doppler information indicator $i_3$. In a yet another embodiment of the disclosure, a single bit indicator can be used to indicate the presence of $i_3$ in the reported PMI.

One additional consideration in reporting a CSI feedback is the CSI reporting frequency granularity. In the 5G NR system, a UE can be configured with a higher layer parameter pmi-FormatIndicator which can be set as "wideband-PMI" or "subbandPMI". When the UE is configured with pmi-FormatIndicator set to "subbandPMI", the UE reports a single wideband indicator $i_1$ for the entire CSI reporting band and distinct subband indicators $i_2$ for each subband in the CSI reporting band. One embodiment based on the disclosure may consider a single Doppler coefficient indicator $i_3$ for the entire CSI reporting band. In a yet another variant of the disclosure, a UE can report the Doppler coefficient indicator $i_3$ per each subband in the CSI reporting band. To enable this, one embodiment of the disclosure, may introduce a new higher layer subbandDopplerReporting. However, in order to manage the CSI reporting overhead a single Doppler coefficient indicator can be reported in wideband manner.

Part II.2: Report Based on Type II CSI

In this subsection, the description of the disclosure is provided by exemplifying it with respect to Type II CSI in the 5G NR system. In Type II codebook (Type II CB), a UE reports indicators $i_1$ and $i_2$. The indicator $i_1$ which may include sub-indicators $i_{1,1}$, $i_{1,2}$, $i_{1,3,1}$, $i_{1,4,1}$ where $l \in \{1,2\}$ is a layer indicator, indicates the spatial channel information and the corresponding wideband amplitude coefficients. On the other hand, another indicator $i_2$ indicates subband amplitude and co-phasing coefficients. In Type II CSI, the spatial channel information includes L 2-dimensional (2D) DFT vectors wherein each member of the L vectors, denoted as $v_{l,m}$, is given as per Equation 2. The value of L is configured by a higher layer parameter numberOfBeams. The components of $i_1$ which are reported in a wideband manner cover the entire CSI reporting band. Moreover, the indicator $i_2$ can be reported in either a wideband or subband manner. If it is reported in a subband manner, it indicates co-phasing and subband amplitude information otherwise it indicates only a co-phasing information. The gNB then makes a precoder for layer l based on the reported PMI as Equation 3

$$W^l = \frac{1}{\sqrt{N_1 N_2 \sum_{i=0}^{2L-1} \left(p_{l,i}^{(1)} p_{l,i}^{(2)}\right)^2}} \begin{bmatrix} \sum_{i=0}^{L-1} v_{m_1^{(i)}, m_2^{(i)}} p_{l,i}^{(1)} p_{l,i}^{(2)} \varphi_{l,i} \\ \sum_{i=0}^{L-1} v_{m_1^{(i)}, m_2^{(i)}} p_{l,i+L}^{(1)} p_{l,i+L}^{(2)} \varphi_{l,i+L} \end{bmatrix}$$

where the L 2D-DFT beams $$\left\{ v_{m_1^{(i)}, m_2^{(i)}} \right\}_{i=0}^{L-1}$$

and the 2L−1 wideband amplitude coefficients $$\left\{ p_{l,i}^{(1)} \right\}_{i=0}^{2L-1}$$

are reported via $\{i_{1,1}, i_{1,2}\}$ and $i_{1,4,l}$, respectively. Moreover, the subband amplitude coefficients $$\left\{ p_{l,i}^{(2)} \right\}_{i=0}^{2L-1}$$

and phase coefficients $$\left\{ \varphi_{l,i}^{(2)} \right\}_{i=0}^{2L-1}$$

are reported via the sub-indicators $i_{2,2,l}$ and $i_{2,1,l}$, respectively.

In one method, Method II.2.1, of the disclosure, a UE may derive Doppler frequencies $$\{f_d^{(i,l)}\},$$

associated with the i=0, 1, ..., 2L−1 2D DFT beams and l=1, 2 layers. Then the UE may report an indicator $i_3$ to indicate the measured Doppler frequency shifts. In particular, when a UE is configured with higher layer parameter codebookType set to 'typeII' or 'typeII-PortSelection' and the parameter timeCorrelatedCSI in the CSI report configuration is enabled, each PMI value corresponds to a codebook indicator $i_1$ and/or the subband amplitude and co-phasing coefficient $i_2$, and a Doppler information indicator $i_3$. The indicator $i_3=[i_{3,1}, ..., i_{3,v}]$ can have sub-indicator $i_{3,l}=[d_{l,0}, d_{l,1} ..., d_{l,2L-1}]$ associated with the l-th layer where the value $d_{l,i}$ corresponds to a Doppler frequency $$f_d^{(i,l)}$$

for the l-th layer and i-th DFT beam (spatial basis). The gNB then derives a Doppler coefficient $$\phi_{i,l}(t) = e^{j2\pi f_{i,l}^{(d)} t}$$

for a time t based on the reported Doppler frequency $$f_{i,l}^{(d)}.$$

The spatial, co-phasing and Doppler information can then be used to construct the precoder associated to a particular layer at an application time t denoted as $W^l(t)$ which is given as:

$$W^l(t) = \frac{1}{\sqrt{N_1 N_2 \sum_{i=0}^{2L-1} (p_{l,i}^{(1)} p_{l,i}^{(2)})^2}} \quad \text{Equation 4}$$

$$\begin{bmatrix} \sum_{i=0}^{L-1} v_{m_1^{(i)},m_2^{(i)}} p_{l,i}^{(1)} p_{l,i}^{(2)} \varphi_{l,i} \phi_{l,i}(t) \\ \sum_{i=0}^{L-1} v_{m_1^{(i)},m_2^{(i)}} p_{l,i+L}^{(1)} p_{l,i+L}^{(2)} \varphi_{l,i+L} \phi_{l,i}(t) \end{bmatrix}$$

The above equation is given as a specific example on how the disclosure can be applied to the case wherein a UE is configured with a codebook configuration set as 'typeII'. However, without loss of generality, when the UE is configured to a codebook type 'typeII-PortSelection', the disclosure including Method II.2. can be applied in a straightforward manner. For example, in the case wherein a UE is configured to codebook type set to 'typeII-PortSelection', Equation 4 is modified by replacing the spatial basis vectors $$\{v_{m_1^{(i)},m_2^{(i)}}\}$$

22 with the appropriate vectors that corresponds to the selected CSI-RS ports.

Moreover, another consideration is reporting of Doppler coefficients in a polarization common manner. In Type II CSI, as the same spatial basis are considered for both polarizations, it is natural and efficient to consider the Doppler coefficients to be reported in polarization common manner. Equation 4 is given for a polarization-common Doppler coefficients reporting, i.e., $$\{\phi_{l,i}(t)\}_{i=0}^{L-1}.$$

However, without departing from the scope of the disclosure, a polarization specific reporting can be considered, i.e., $$\{\phi_{l,i}(t)\}_{i=0}^{2L-1}.$$

FIG. 14 illustrates another time-correlated CSI reporting for Type II CSI with Doppler co-phasing correction coefficients according to an embodiment of the disclosure.

An illustration of embodiment for Method II.1.1 is provided in FIG. 14. In the figure, the UE which is configured with a bundled CSI-RS resource(s) (1401) derives time correlated CSI (1402) report which contains a spatial information indicator $i_1$, co-phasing indicators $\{i_2\}$ and Doppler coefficient indicator $i_3$. Upon receiving the time correlated CSI report (1402), the gNB constructs the corresponding precoders (1403)-(1405) for the corresponding application time t=1, 2, 3. In particular, for application time (PDSCH scheduling time) t the gNB may apply the precoder W(t) as $$\begin{bmatrix} \sum_i b_i p_{i,l} \varphi_{i,l} \phi_{i,l}(t) \\ \sum_i b_i p_{i+L,l} \varphi_{i+L,l} \phi_{i+L,l}(t) \end{bmatrix}.$$

Thus additional Doppler coefficients φ are used to construct the precoders in addition to beam b, amplitude coefficients p and co-phasing coefficients φ.

As a part of the disclosure, the mapping between the reported Doppler coefficient indicator and the Doppler shift can be considered. In one Method, Method II.2.1 a multitude of mapping Tables for Doppler coefficient indicator to Doppler frequency shift mapping can be considered. Each table may then correspond to a distinct maximum Doppler frequency $F_{max}$. As an example, Table 3A and 3B illustrate a 3-bit indicator $i_3$ for $F_{max}$ and $F_{max}$, respectively. The codepoint of the indicator can be mapped to the value $d_{i,l}$ in an increasing order, i.e., the codepoint 000 is mapped to 0, codepoint 001 to 1, and so on. Based on a specific Doppler indicator value to Doppler frequency mapping table, the value d can be mapped to Doppler frequency shift value $$f_{i,l}^{(d)}.$$

TABLE 3A

| $d_{i,l}$ | $f_{i,l}^{(d)}$ |
|---|---|
| 0 | −200 |
| 1 | −150 |
| 2 | −100 |
| 3 | −50 |
| 4 | 50 |
| 5 | 100 |
| 6 | 150 |
| 7 | 200 |

TABLE 3B

| $d_{i,l}$ | $f_{i,l}^{(d)}$ (Hz) |
|---|---|
| 0 | −500 |
| 1 | −250 |
| 2 | −125 |
| 3 | −100 |
| 4 | 125 |
| 5 | 250 |
| 6 | 375 |
| 7 | 500 |

As part of Method II.2.1., the gNB may indicate, via RRC or MAC-CE signaling, to the UE the mapping table for Doppler coefficient indicator to Doppler frequency shift. As an example, an RRC parameter dopplerMappingTable can be introduced which indicates to the UE the mapping Table to use upon reporting the time-varying CSI. This RRC parameter can be configured under codebookConfig RRC IE as above.

```
CodebookConfig ::= SEQUENCE {
codebookType CHOICE {
•
•
•
type2 SEQUENCE {
subType CHOICE {
typeII SEQUENCE {
•
•
•
typeII-RI-Restriction BIT STRING (SIZE (2))
},
typeII-PortSelection SEQUENCE {
portSelectionSamplingSize ENUMERATED {n1, n2, n3, n4}
OPTIONAL, -- Need R
typeII-PortSelectionRI-Restriction BIT STRING (SIZE (2))
}
},
phaseAlphabetSize ENUMERATED {n4, n8},
subbandAmplitude BOOLEAN,
dopplerMappingTable ENUMERATED {table 1, table2, table3,...}
OPTIONAL
```

In a yet another method, Method II.2.2, a scalable mapping between Doppler coefficient indicator and Doppler frequency shift can be considered. Moreover, the UE may receive a configuration from the gNB, about the maximum Doppler frequency $F_{max}$. As an example, Table 4 illustrate a 3-bit indicator $i_3$. The codepoint of the indicator can be mapped to the value $d_{i,l}$ in an increasing order, i.e., the codepoint 000 is mapped to 0, codepoint 001 to 1, and so on.

Then the value $d_{i,l}$ can be mapped to Doppler frequency shift value $$f_{i,l}^{(d)}.$$

TABLE 4

| d | $f_d$ (Hz) |
|---|---|
| 0 | $-F_{max}$ |
| 1 | $-3/4\ F_{max}$ |
| 2 | $-1/2\ F_{max}$ |
| 3 | $-1/4\ F_{max}$ |
| 4 | $1/4\ F_{max}$ |
| 5 | $1/2\ F_{max}$ |
| 6 | $3/4\ F_{max}$ |
| 7 | $F_{max}$ |

As part of Method II.2.2, the gNB may indicate, via RRC or MAC-CE signaling, to the UE the maximum Doppler frequency shift. As an example, an RRC parameter maxDopplerShift can be introduced which indicates to the UE the maximum Doppler frequency $F_{max}$ which can be used in a mapping table such as Table 4. This RRC parameter can be configured under codebookConfig as above.

```
CodebookConfig ::= SEQUENCE {
codebookType CHOICE {
•
•
•
type2 SEQUENCE {
subType CHOICE {
typeII SEQUENCE {
•
•
•
typeII-RI-Restriction BIT STRING (SIZE (2))
},
typeII-PortSelection SEQUENCE {
portSelectionSamplingSize ENUMERATED {n1, n2, n3, n4}
OPTIONAL, -- Need R
typeII-PortSelectionRI-Restriction BIT STRING (SIZE (2))
}
},
phaseAlphabetSize ENUMERATED {n4, n8},
subbandAmplitude BOOLEAN,
maxDopplerShift ENUMERATED {fmax1, fmax2, fmax3,...}
OPTIONAL
```

One may notice in Tables 3A, 3B and 4 that the Doppler coefficient, indicator and value associated to $f_d=0$ is not available. In the case wherein the UE is configured with an RRC parameter timeVaryingCSI and expected to report a Doppler information, if the estimated Doppler corresponds to the value $f_d=0$ the UE may not report the Doppler information indicator $i_3$. In some embodiments of the disclosure, a single bit indicator can be used to indicate the presence/absence of $i_3$ in the reported PMI.

One additional consideration in reporting a CSI feedback is the CSI reporting frequency granularity. In the 5G NR system, a UE can be configured with a higher layer parameter pmi-FormatIndicator which can be set as "wideband-PMI" or "subbandPMI". When the UE is configured with pmi-FormatIndicator set to "subbandPMI", the UE reports a single wideband indicator $i_1$ for the entire CSI reporting band and distinct subband indicators $i_2$ for each subband in the CSI reporting band. One embodiment based on the disclosure may assume a single Doppler coefficient indicator $i_3$ for the entire CSI reporting band. In a yet another variant of the disclosure, a UE can report the Doppler coefficient indicator $i_3$ per each subband in the CSI reporting band. To enable this, one embodiment of the disclosure, may introduce a new higher layer subbandDopplerReporting. However, in order to manage the CSI reporting overhead a single Doppler coefficient indicator can be reported in wideband manner.

Another consideration for Method II.2. is that reporting of the Doppler co-phasing correction coefficients can be just for the subset of coefficients rather than to all coefficients. In one sub-embodiments that can be applied to Method II.2, the indicator $i_3$ corresponds to $K^{(3)}$ weakest/strongest coefficients determined by the wideband amplitude indicator $i_{1,4,l}$. If the number of nonzero amplitude coefficients are reported by the UE as $M_l$, then the Doppler coefficient indicator $i_3$ corresponds to $\min(K^{(3)}, M_l)$ weakest/strongest coefficients as determined by the wideband amplitude indicator $i_{1,4,l}$. The value of $K^{(3)}$ named as dopplerUpdatedCoefficients can be introduced and be configured by an RRC signaling or hard configured in the specification.

```
CodebookConfig ::= SEQUENCE {
codebookType CHOICE {
•
•
•
type2 SEQUENCE {
subType CHOICE {
typeII SEQUENCE {
•
•
•
typeII-RI-Restriction BIT STRING (SIZE (2))
},
typeII-PortSelection SEQUENCE {
portSelectionSamplingSize ENUMERATED {n1, n2, n3, n4}
OPTIONAL, -- Need R
typeII-PortSelectionRI-Restriction BIT STRING (SIZE (2))
}
},
phaseAlphabetSize ENUMERATED {n4, n8},
subbandAmplitude BOOLEAN,
numberOfBeams ENUMERATED {two, three, four)
dopplerUpdatedCoefficients ENUMERATED {two, three, four, six}
OPTIONAL
```

To further reduce the CSI overhead associated with reporting the Doppler correction coefficients, the reported coefficients of $i_3$ can be further reduced. In one embodiment, a UE may correct/update the co-phasing coefficients only for a subset of DFT beams per application time. FIG. 15 illustrates another time-correlated CSI reporting with subset of spatial basis according to an embodiment of the disclosure. FIG. 15 gives a pictorial example for updating a subset of DFT beams. In the figure, the UE derives the typeII CSI based on L=4 DFT beams (1501). The amplitude and phase information are reported per subband (1502) manner. The UE can be configured with a new RRC parameter, e.g., dopplerUpdatedCoefficients as shown above, on the number of DFT beams that are updated per application time $K^{(3)}$. Then Doppler coefficients indicator $i_3$ is reported only for $K^{(3)}$ strongest DFT beams.

A yet another consideration is that reporting the Doppler coefficients in a layer-common manner. As the Doppler information is dependent on angular and delay information of the channel and owing to the selection of common spatial basis across the transmission layers, the Doppler coefficient can be reported in a layer-common manner. In this case, the subscript 1 can be dropped from $\phi_{i,l}$ in Equation 4 and modified as $\phi_i$.

Another approach to further limit the CSI feedback overhead associated with the Doppler information feedback is to report a single strongest Doppler coefficient and the remaining other remaining $\min(K^{(3)}, M_l)-1$ coefficients on the basis of the strongest coefficient. In particular, $K_1$ and $K_2$ bits can be used to report the strongest Doppler coefficient and the remaining coefficients, respectively, where $K_1 > K_2$. In this case an indicator to indicate the DFT beam associated with the strongest beam is required. One example is a $\lceil \log_2 L \rceil$-bit indicator $i_{3,l,2}$ for the case of polarization-common Doppler coefficients reporting. As an example, if the strongest Doppler coefficient $$f^{(d)}_{i_{3,l,2},l}$$

is reported based on 3-bits as in Table 4, then a 2-bit reporting can be considered for the remaining beams with the following indicator to value mapping table.

TABLE 5

| $d_{i,l}$ | $f^{(d)}_{i,l}$ |
|---|---|
| 0 | 0 |
| 1 | $1/3\ f^{(d)}_{i_{3,l,2},l}$ |
| 2 | $2/3\ f^{(d)}_{i_{3,l,2},l}$ |
| 3 | $f^{(d)}_{i_{3,l,2},l}$ |

Part II.3: Report Based on Enhanced Type II CSI

In this subsection, the description of the disclosure is provided by exemplifying it with respect to Enhanced Type II CSI in the 5G NR system. In the Enhanced Type II codebook (eType II CB), a UE reports indicators $i_1$ and $i_2$. The indicator $i_1$ which may include sub-indicators $i_{1,1}$, $i_{1,2}$, $i_{1,5}$, $i_{1,6,l}$, $i_{1,7,l}$, $i_{1,8,l}$, for transmission layers $l \in \{1,2,3,4\}$, indicates the spatial channel information (spatial basis) and the frequency domain (FD) basis information. In particular, the indicators $i_{1,1}$ and $i_{1,2}$ select and indicate spatial basis (2L 2D-DFT beams) whereas $i_{1,5}$ and $i_{1,6,l}$ select $M_v$ FD basis. Furthermore, the subindicator $i_{1,7,l}$ indicates the position of nonzero coefficients from $2L \times M_v$ elements of $W_2$ (706) and $i_{1,8,l}$ indicates the strongest coefficient of layer l. Moreover, the indicator $i_2$ consisting subindicators $i_{2,3,l}$, $i_{2,4,l}$, and $i_{2,5,l}$, wherein, they correspond to a 4-bit per-angle domain (delay-common) amplitude coefficient, a 3-bit per angle-delay domain (delay-specific) amplitude coefficient and 16-psk co-phasing coefficients for angle-delay components, respectively. Then, the gNB constructs the precoder for the l-th layer and t=1, 2, . . . , $N_3$ frequency bin as:

$$W_t^l = \frac{1}{\sqrt{N_1 N_2 \gamma_{t,l}}} \left[ \begin{array}{c} \sum_{i=0}^{L-1} v_{m_1^{(i)},m_2^{(i)}} p_{l,0}^{(1)} \sum_{f=0}^{M_v-1} y_{t,l}^{(f)} p_{l,i,f}^{(2)} \varphi_{l,i,f} \\ \sum_{i=0}^{L-1} v_{m_1^{(i)},m_2^{(i)}} p_{l,1}^{(1)} \sum_{f=0}^{M_v-1} y_{t,l}^{(f)} p_{l,i+L,f}^{(2)} \varphi_{l,i+L,f} \end{array} \right] \quad \text{Equation 5}$$

where $$v_{m_1^{(i)},m_2^{(i)}}$$

is a 2D-DFT beams as defined in Equation 2 and $$p_{l,x}^{(1)},$$

x=0, 1 is an amplitude coefficient for the x-th cross-polar-ization. Additionally, $$y_{t,l}^{(f)}$$

is the t=1, 2, . . . , $N_3$-th element of f-th FD basis vector as selected by $i_{1,5,l}$ and $i_{1,6,l}$. Finally, $$p_{l,i,f}^{(2)}$$

and $\varphi_{l,i,f}$ are the amplitude and phase coefficients for the (i-th, f-th) angle-delay pair.

In one method, Method II.3, of the disclosure, a UE derives Doppler frequency shift Coefficients that can be reported when a UE reports for time-correlated CSI. In particular, when a UE is configured with higher layer parameter codebookType set to 'typeII-r16' or 'typeII-Port-Selection-r16' and the parameter timeCorrelatedCSI in the CSI report configuration is enabled, each PMI value corre-sponds to a codebook indicator $i_1$, $i_2$ and a Doppler coeffi-cient indicator $i_3$. The indicator $i_3=[_{3,1}, . . . , i_{3,v}]$ can have sub-indicator $i_{3,l}=[i_{3,l,0}, i_{3,l,1} . . . , i_{3,l,L-1}]$ wherein is $i_{3,l,i}=[d_{l,i,0} . . . d_{l,i,M_v-1}]$ and the value $d_{l,i,f}$ corresponds to a Doppler frequency shift $$f_{l,i,f}^{(d)}$$

for the l-th layer, i-th DFT beam (spatial basis) and f-th FD basis, i.e., (I,f) angle-delay pair. The gNB then derives a Doppler coefficient $$\phi_{l,i,f}(n) = e^{j2\pi f_{l,i,f}^{(d)} n}$$

for PDSCH scheduling time n based on the reported Doppler frequency $$f_{l,i,f}^{(d)}.$$

Owing to notation of a frequency bin by 't' in eType II CSI, the variable "n" is used in this section to denote the PDSCH scheduling time as opposed to "t" in the previous sections. The spatial, co-phasing and Doppler information can then be used to construct the precoder associated to a particular layer at an application time t denoted as $W^l(t)$ and given as:

$$W_t^l(n) = \frac{1}{\sqrt{N_1 N_2 \gamma_{t,l}}}$$

Equation 6

-continued $$\left[ \begin{array}{c} \sum_{i=0}^{L-1} v_{m_1^{(i)},m_2^{(i)}} p_{l,0}^{(1)} \sum_{f=0}^{M_v-1} y_{t,l}^{(f)} p_{l,i,f}^{(2)} \varphi_{l,i,f} \phi_{l,i,f}(n) \\ \sum_{i=0}^{L-1} v_{m_1^{(i)},m_2^{(i)}} p_{l,1}^{(1)} \sum_{f=0}^{M_v-1} y_{t,l}^{(f)} p_{l,i+L,f}^{(2)} \varphi_{l,i+L,f} \phi_{l,i,f}(n) \end{array} \right]$$

Moreover, another consideration is reporting of Doppler coefficients in a polarization common manner. In Type II CSI, as the same spatial basis are considered for both polarizations, it is natural and efficient to consider the Doppler coefficients to be reported in polarization common manner. Equation 6 is given for a polarization-common Doppler coefficients reporting, i.e., $$\{\phi_{l,i,f}(t)\}_{i=0}^{L-1}.$$

However, without departing from the scope of the disclo-sure, a polarization specific reporting can be considered, i.e., $$\{\phi_{l,i,f}(t)\}_{i=0}^{2L-1}.$$

The above equation (Equation 6) is given as a specific example on how the disclosure can be applied to the case wherein a UE is configured with a codebook configuration set as 'typeII-r16'. However, without loss of generality, when the UE is configured to a codebook type 'typeII-PortSelection-r16', the disclosure including Method II.3. can be applied in a straightforward manner. For example, in the case wherein a UE is configured to codebook type set to 'typeII-PortSelection-r16', Equation 6 is modified by replac-ing the spatial basis vectors $$\left\{ v_{m_1^{(i)},m_2^{(i)}} \right\}$$

with the appropriate vectors that corresponds to the selected CSI-RS ports.

FIG. 16 illustrates another time-correlated CSI reporting for enhanced Type II CSI with Doppler frequency shift coefficients according to an embodiment of the disclosure.

An illustration of embodiment for Method II.3.1 is pro-vided in FIG. 16. In the figure, the UE which is configured with a bundled CSI-RS resource(s) (1601) derives time correlated CSI report (1602) which contains a single spatial information indicator $i_1$, amplitude and co-phasing indicator $i_2$ and Doppler coefficient indicator $i_3$. Upon receiving the time correlated CSI report (1602), the gNB derives the corresponding precoders (1603)-(1605) for the correspond-ing application time n=$n_1$, $n_2$, $n_3$. In particular, recalling the three-stage precoder format of eType II CSI, i.e., $$W = W_1 W_2 W_f^H,$$

for application time n the gNB may apply the precoder W(n) by keeping the spatial basis ($W_1$) and FD-basis matrices ($W_f$), while deriving the specific $W_{2,n}$ for $W_2$. Thus, addi-tional Doppler coefficients p are used to capture the pro-gression of $W_2$ in the time-domain n=$n_1$, $n_2$ . . . .

As a part of the disclosure, the mapping between the reported Doppler coefficient indicator and the Doppler frequency shift can be considered. In one method, Method II.3.1 a multitude mapping tables for Doppler coefficient indicator to Doppler frequency shift mapping can be considered. Each table may then correspond to a distinct maximum Doppler frequency $F_{max}$. As an example, Tables 6A and 6B illustrate a 3-bit indicator $i_3$ for $F_{max}$ and $F_{max}$, respectively. The codepoint of the indicator can be mapped to the value $d_{l,i,f}$ in an increasing order, i.e., the codepoint 000 is mapped to 0, codepoint 001 to 1, and so on. Based on a specific Doppler value to Doppler frequency shift mapping table, the value d can be mapped to a Doppler frequency shift value $$f_{l,i,f}^{(d)}.$$

TABLE 6A

| $d_{i,l}$ | $f_{l,i,f}^{(d)}$ |
|---|---|
| 0 | −200 |
| 1 | −150 |
| 2 | −100 |
| 3 | −50 |
| 4 | 50 |
| 5 | 100 |
| 6 | 150 |
| 7 | 200 |

TABLE 6B

| $d_{i,l}$ | $f_{l,i,f}^{(d)}$ (Hz) |
|---|---|
| 0 | −500 |
| 1 | −250 |
| 2 | −125 |
| 3 | −100 |
| 4 | 125 |
| 5 | 250 |
| 6 | 375 |
| 7 | 500 |

As part of Method II.3.1., the gNB may indicate, via RRC or MAC-CE signaling, to the UE the mapping table for Doppler coefficient indicator to Doppler frequency shift. As an example, an RRC parameter dopplerMappingTable can be introduced which indicates to the UE the mapping table to be used upon reporting the time-varying CSI. This RRC parameter can be configured under codebookConfig as below.

```
CodebookConfig ::= SEQUENCE {
codebookType CHOICE {
•
•
•
type2 SEQUENCE {
subType CHOICE {
typeII SEQUENCE {
•
•
•
typeII-RI-Restriction BIT STRING (SIZE (2))
},
```

-continued

```
typeII-PortSelection SEQUENCE {
portSelectionSamplingSize ENUMERATED {n1, n2, n3, n4}
OPTIONAL, -- Need R
typeII-PortSelectionRI-Restriction BIT STRING (SIZE (2))
}
},
phaseAlphabetSize ENUMERATED {n4, n8},
subbandAmplitude BOOLEAN,
dopplerMappingTable ENUMERATED {table1, table2, table3,...}
OPTIONAL
```

In a yet another Method, Method II.3.2, a scalable Doppler coefficient indicator to Doppler frequency shift mapping tables can be considered. Moreover, the UE may receive a configuration from the gNB, about the maximum Doppler frequency $F_{max}$. As an example, Table 7 illustrate a 3-bit indicator $i_3$. The codepoint of the indicator can be mapped to the value $d_{l,i,f}$ in an increasing order, i.e., the codepoint 000 is mapped to 0, codepoint 001 to 1, and so on. Then the value $d_{l,i,f}$ can be mapped to Doppler frequency shift value $$f_{l,i,f}^{(d)}.$$

TABLE 7

| $d_{i,l}$ | $f_{l,i,f}^{(d)}$ (Hz) |
|---|---|
| 0 | $-F_{max}$ |
| 1 | $-3/4\ F_{max}$ |
| 2 | $-1/2\ F_{max}$ |
| 3 | $-1/4\ F_{max}$ |
| 4 | $1/4\ F_{max}$ |
| 5 | $1/2\ F_{max}$ |
| 6 | $3/4\ F_{max}$ |
| 7 | $F_{max}$ |

As part of Method II.3.2, the gNB may indicate, via RRC or MAC-CE signaling, to the UE the maximum Doppler frequency shift. As an example, an RRC parameter maxDopplerShift can be introduced which indicates to the UE the mapping Table to use upon reporting the time-varying CSI. This RRC parameter can be configured under codebookConfig as below.

```
CodebookConfig ::= SEQUENCE {
codebookType CHOICE {
•
•
•
type2 SEQUENCE {
subType CHOICE {
typeII-r16 SEQUENCE {
•
•
•
typeII-r16-RI-Restriction BIT STRING (SIZE (2))
},
typeII-PortSelection SEQUENCE {
portSelectionSamplingSize ENUMERATED {n1, n2, n3, n4}
OPTIONAL, -- Need R
typeII-PortSelectionRI-Restriction BIT STRING (SIZE (2))
}
},
phaseAlphabetSize ENUMERATED {n4, n8}.
subbandAmplitude BOOLEAN,
maxDopplerShift ENUMERATED {fmax1, fmax2, fmax3,...}
OPTIONAL
```

One may notice in Tables 6A, 6B and 7 that the Doppler coefficient, indicator and value associated to the Doppler frequency value $$f_{l,i,f}^{(d)} = 0$$

is not available. In the case wherein the UE is configured with an RRC parameter timeVaryingCSI and is expected to report a Doppler information, if the estimated Doppler corresponds to the value $$f_{l,i,f}^{(d)} = 0,$$

then the UE may not report the corresponding component (subindicator) of Doppler information indicator $i_3$. In some embodiments of the disclosure, a single bit indicator can be used to indicate the presence/absence of a subindicator in $i_3$.

To further reduce the CSI overhead associated with reporting the Doppler correction coefficients, the number of reported subindicators of $i_{3,l}$ can be further reduced. In one embodiment of Method II.3, a UE may report Doppler coefficients for only a subset of angle-delay pairs. In one embodiment, an RRC based configuration for the number of angle-delay pairs can be provided to the UE. A parameter $K^{Doppler}$, e.g., named K-DopplerReportedCoefficients, can be configured to the UE with RRC parameter. Upon reception of such configuration, a UE may report Doppler coefficients only for the weakest/strongest $K^{Doppler}$ angle-delay pairs.

In a yet another embodiment, a gNB may update the value of $K^{Doppler}$ via dynamic signaling such as MAC-CE or DCI based (re)configuration. This may be important in the case that the channel condition, the relative speed of the UE with respect of the gNB and other factors change dynamically.

FIG. 17 provides an illustration of one embodiment of Method II.3. In the figure, a UE is configured to report up to $2K_0$ nonzero coefficients. If the UE reports, $K^{NZ} \ll 2K_0$ nonzero coefficients (1700) among $2L \times M_v$ coefficients, the amplitude and co-phasing coefficients for the zero coefficients (1701) will not be reported.

```
CodebookConfig-r16 ::= SEQUENCE {
codebookType CHOICE {
type2 SEQUENCE {
subType CHOICE {
typeII-r16 SEQUENCE {
n1-n2-codebookSubsetRestriction-r16 CHOICE {
·
·
·
},
typeII-RI-Restriction-r16 BIT STRING (SIZE(4))
},
typeII-PortSelection-r16 SEQUENCE {
portSelectionSamplingSize-r16 ENUMERATED {n1, n2, n3, n4},
typeII-PortSelectionRI-Restriction-r16 BIT STRING (SIZE (4))
}
},
numberOfPMI-SubbandsPerCQI-Subband-r16 INTEGER (1..2),
paramCombination-r16 INTEGER (1..8)
}
}
}
K-DopplerReportedCoefficients ENUMERATED {two, three, four, six}
OPTIONAL
FD-commonDopplerReport ENUMERATED {enabled} OPTIONAL
```

Furthermore, two ways of reporting Doppler coefficients for the non-zero angle-delay components can be considered. In one way, the Doppler coefficients can be reported in a FD-basis specific (delay specific) manner. This is illustrated in the example given in part (b) of FIG. 17. On the other hand, the UE can be configured to report Doppler coefficients in an FD-basis common (delay-common) manner as illustrated in part (c) of FIG. 17. This configuration can be indicated to the UE from gNB by a new higher layer parameter FD-commonDopplerReport.

If a parameter $K^{Doppler}$, i.e., the K-DopplerUpdatedCoefficients is configured to the UE and the Doppler co-phasing correction is to be updated in a delay-angle (FD specific manner, i.e., FD-commonDopplerReport is enabled (part (b) of FIG. 17), then the UE reports $\min(K^{NZ}, K^{Doppler})$ Doppler co-phasing correction coefficients (considering either the weakest or strongest coefficients). On the other hand, if the UE is configured with a parameter $K^{Doppler}$, i.e., the number of updates is configured to the UE and the Doppler coefficient is to be updated in a FD-basis-common manner i.e., FD-commonDopplerReport is absent (part (c) of FIG. 17), then the UE reports $\min(K^{NZ}, K^{Doppler})$ Doppler coefficients to the selected angle (based on the weakest or strongest coefficients). In other words, if the Doppler coefficients are configured to be reported in FD-basis-common manner, then the UE reports $\min(K^{NZ}, K^{Doppler})$ Doppler coefficients and each reported coefficient is applied to all non-zero FD-basis components in the corresponding spatial basis (i.e., 2D-DFT beam or CSI-RS port index).

To configure the UE with either FD-basis specific or FD-basis common Doppler coefficients, this disclosure introduces an RRC parameter, e.g., named as FD-common-DopplerReport. If FD-commonDopplerReport is enabled the Doppler coefficients are reported in FD-basis common manner; otherwise, they are reported in FD-basis specific manner. When the Doppler coefficients are reported in a FD common manner, Equation 6 is modified as Equation 7 by dropping the FD basis subscript (f) from $\phi_{l,i,f}(n)$ as $\phi_{l,i}(n)$.

Equation 7

$$W_t^i(n) =$$

$$\frac{1}{\sqrt{N_1 N_2 \gamma_{t,l}}} \left[ \begin{array}{l} \sum_{i=0}^{L-1} v_{m_1^{(i)},m_2^{(i)}} p_{l,0}^{(1)} \phi_{l,i}(n) \sum_{f=0}^{M_v-1} y_{t,l}^{(f)} p_{l,i,f}^{(2)} \varphi_{l,i,f} \\ \sum_{i=0}^{L-1} v_{m_1^{(i)},m_2^{(i)}} p_{l,1}^{(1)} \phi_{l,i}(n) \sum_{f=0}^{M_v-1} y_{t,l}^{(f)} p_{l,i+L,f}^{(2)} \varphi_{l,i+L,f} \end{array} \right]$$

Another approach to further limit the CSI feedback overhead associated with the Doppler information feedback is to report a single strongest Doppler coefficient and the remaining other remaining $\min(K^{(3)}, K^{NZ}) - 1$ coefficients on the basis of the strongest coefficient. In particular, $K_1$ and $K_2$ bits can be used to report the strongest Doppler coefficient and the remaining coefficients, where $K_1 > K_2$, respectively. In this case an indicator to indicate the angle-delay component associated with the strongest beam is required.

One example is a $\lceil \log_2 L \rceil$-bit indicator $i_{3,l,2}$ for the case wherein FD-commonDopplerReport is enabled. Another example is a $\lceil \log_2(L \times M_v) \rceil$-bit indicator $i_{3,l,2}$ for the case wherein FD-commonDopplerReport is absent. As an example, if the strongest Doppler coefficient $$f_{l,i3,l,2,f}^{(d)}$$

is reported based on a 3-bit subindicator as in Table 7, then 2-bit subindicators can be considered for the remaining beams with the following indicator to value mapping table.

TABLE 8

| $d_{i,l}$ | $f^{(d)}_{l,i,f}$ |
|---|---|
| 0 | 0 |
| 1 | $1/3\, f^{(d)}_{l,i_{3,l,2},f}$ |
| 2 | $2/3\, f^{(d)}_{l,i_{3,l,2},f}$ |
| 3 | $f^{(d)}_{l,i_{3,l,2},f}$ |

Doppler Domain Compression and Reporting Configuration

In some cases, it may be beneficial to compress the CSI feedback in the time domain, i.e., Doppler domain reporting. As an example, the CSI feedback that can be applied to n=1, 2, . . . , $N_4$ time instances is shown in FIG. 18. In particular, as explained in FIG. 16, the $N_4$ precoder matrices Ws share the same SD and FD basis vectors selection matrices, i.e., $W_1$ and $W_f$, while distinctive linearly combining (LC) matrices ($W_2$s), i.e., $W_{2,1}$, $W_{2,2}$, . . . , $W_{2,N_4}$. One issue here is the reporting overhead as the LC matrices constitute the large portion of the reporting overhead. To reduce this overhead, the PMI reporting can be compressed further in the time (Doppler) domain. Let $W_2=[\mathrm{vec}(W_{21})\mathrm{vec}(W_{22})$ . . . vec $(W_{2N_4})]$ and $\breve{W}_2=W_{DFT}W_2$, where vec(.) Vectorizes the matrices by concatenating the columns. Then, Q dominant columns, e.g., columns with largest norm, of $\breve{W}_2$ can be reported as approximation of $W_2$. Then, the Q corresponding columns of $W_{DFT}$ can be termed as Doppler domain (DD) basis vectors.

FIG. 18 illustrates the different levels of compression that can be applied. In part (a) of FIG. 18, the dimension for 'uncompressed' precoding matrices for $N_T$ antenna ports $N_3$ PMI reporting bands and $N_4$ reporting time instances is depicted. On the other hand, part (b) of FIG. 18 shows the dimension of the LC matrices after spatial-frequency domain compression, i.e., after the L and $M_v$ dominant angular domain (per polarization) and delay domain components, respectively, are selected. Note here that, in part (b) of FIG. 18, there are still $N_4$ LC matrices in time domain. Finally, in part (c) of FIG. 18, three-dimensionally compressed CSI is shown which is achieved by reporting Q<$N_4$ Doppler domain components. Then the precoding vector for the l-th layer, at t-th PMI reporting band and n-th PMI reporting instance (sub-time) is given as:

$$W^l_{q_1,q_2,n_1,n_2,n_{3,l},p^{(1)}_l,p^{(2)}_l,i_{2,5,l},t,n} = \frac{1}{\sqrt{N_1 N_2 \gamma_{t,n,l}}} W^l_{q_1,q_2,n_1,n_2,n_{3,l},p^{(1)}_l,p^{(2)}_l,i_{2,5,l},t,n} =$$

$$\frac{1}{\sqrt{N_1 N_2 \gamma_{t,n,l}}} \begin{bmatrix} \sum_{i=0}^{L-1} v_{m_1^{(i)},m_2^{(i)}} p^{(1)}_{l,0} \sum_{f=0}^{M_v-1} \sum_{f_d=0}^{Q} y^{(f,f_d)}_{t,l} p^{(2)}_{l,i,f,f_d} \varphi_{l,i,f,f_d} \\ \sum_{i=0}^{L-1} v_{m_1^{(i)},m_2^{(i)}} p^{(1)}_{l,1} \sum_{f=0}^{M_v-1} \sum_{f_d=0}^{Q} y^{(f,f_d)}_{t,n,l} p^{(2)}_{l,i+L,f,f_d} \varphi_{l,i+L,f,f_d} \end{bmatrix},$$

$$l = 1, 2, 3, 4,$$

$$\gamma_{t,n,l} = \sum_{i=0}^{2L-1} \left(p^{(1)}_{l,\lfloor\frac{i}{L}\rfloor}\right)^2 \left| \sum_{f=0}^{M_v-1} \sum_{f_d=0}^{Q} y^{(f,f_d)}_{t,n,l} p^{(2)}_{l,i,f,f_d} \varphi_{l,i,f,f_d} \right|^2$$

and the mappings from $i_1$ to $q_1$, $q_2$, $n_1$, $n_2$, $n_{3,1}$, $n_{3,2}$, $n_{3,3}$, $n_{3,4}$, and from $i_2$ to $i_{2,5,1}$, $i_{2,5,2}$, $i_{2,5,3}$, $i_{2,5,4}$, $$p^{(1)}_1, p^{(1)}_2, p^{(1)}_3 \text{ and } p^{(1)}_4, p^{(2)}_1, p^{(2)}_2, p^{(2)}_3 \text{ and } p^{(2)}_4$$

are as described above, including the ranges of the constituent indices of $i_1$ and $i_2$ are as described in Section 5.2.2.2.5 of TS 38.214. Moreover, $$y^{(f,f_d)}_{t,n,l} = e^{j\frac{2\pi t n^{(f)}_{3,l}}{N_3} + \frac{2\pi n n^{(f_d)}_{4,l}}{N_4}}.$$

In one embodiment of the disclosed disclosure, the number of time domain PMI reporting instances (sub-times) $N_4$ and the number of Doppler domain basis vectors Q configured by an RRC configuration.

In a yet another embodiment of the this disclosure, the number of time domain PMI reporting instances (PMI sub-times) $N_4$ and the ratio between $N_4$ and Q given by a parameter, e.g., $\delta_v$, is configured by the gNB via RRC signaling. Then, the UE derives Q=$\lceil N_4 \, \delta_v \rceil$.

In a yet another consideration, the parameter $\delta_v$ can be configured as an index of a table for specified parameter combinations wherein each parameter combination consists of the $\rho_v$, $\beta$, $\delta_v$, and L. Candidate values for $\delta_v$ may include {¼, ½, ¾, 1, . . . }. $\delta_v$ can be dependent the reported rank v or independent of the reported rank in which case it can be simply denoted as $\delta$.

In a yet another consideration of the disclosure, when Q=$N_4$, e.g., the aforementioned parameter is configured as $\delta_v$=1, then Doppler domain compression may not be applied. Then, the UE assumes $$y^{(f,f_d)}_{t,n,l} = e^{j\frac{2\pi t n^{(f)}_{3,l}}{N_3}} \text{ for } n = f_d$$

for n=$f_d$ and $$y^{(f,f_d)}_{t,n,l} = 0 \text{ for } n \neq f_d$$

CQI Reporting Configuration

In legacy CSI reporting, e.g., Rel-15 to Rel-17 of the NR, the channel quality indication (CQI) is calculated conditioned on the reported precoder (PMI), rank indicator (RI) and (CRI). In time-correlated CSI reporting discussed in the aforementioned sections, a PMI report at a single reporting subband (in frequency domain) may correspond to multiple ($N_4$) precoders (in time domain) applied over $N_4$ time instances.

In one aspect of the disclosed disclosure, the gNB configures the UE to report a single time-domain CQI per CQI reporting subband. The UE then calculates the CQI conditioned on all the precoders over the ($N_4$) time instances (PMI sub-times).

In a yet another aspect of the disclosed disclosure, the gNB configures the UE to report multiple time-domain CQIs per each CQI reporting subband. The gNB may additionally configure the UE with the corresponding time instances (CQI sub-times) for each of the time-domain CQIs. The UE then calculates each CQI from the multiple time-domain CQIs conditioned on the precoders over the corresponding configured CQI sub-time units (1902 of FIG. 19) of a corresponding CQI reporting subband.

In one embodiment of the disclosure, the gNB may explicitly configure the UE with the number of time-domain CQIs per each CQI reporting subband to report.

In a yet another consideration, the number of time-domain CQIs per each CQI reporting subband can be configured with respect to the number of PMI reporting sub-time units ($N_4$). In an embodiment, the gNB may configure the UE with the ratio of the number of PMIs and CQIs reported per each reporting subband.

In particular, the gNB may configure a parameter $R_{DD}$. Then, the UE reports $$\left\lceil \frac{N_4}{R_{DD}} \right\rceil CQIs$$

per each CQI reporting subband.

With respect to the aforementioned configuration, if mod $(N_4, R_{DD})=0$, each reported CQI of a CQI reporting subband corresponds to $$\frac{N_4}{R_{DD}} PMI$$

sub-time units 1901. In this case, each of the $$\frac{N_4}{R_{DD}} PMI$$

sub-time units can be referred as CQI sub-time unit (1902 of FIG. 19). The first reported CQI among the CQIs of a CQI reporting subband with respect to the ordinal position in uplink control unit (UCI) carrying the corresponding CSI reporting is mapped to the first CQI subtime units i.e., $$\frac{N_4}{R_{DD}} PMI$$

sub-time units. Conversely, the second reported CQI among the CQIs of a CQI reporting subband with respect to the ordinal position in uplink control information (UCI) carrying the corresponding CSI reporting is mapped to the second CQI subtime units i.e., $$\frac{N_4}{R_{DD}} PMI$$

sub-time units, and so on.

With respect to the aforementioned configuration, if mod $(N_4, R_{DD}) \neq 0$, each reported CQI of a CQI reporting subband, except the last one, of a corresponds to $$\frac{N_4}{R_{DD}} PMI$$

sub-time units. The last CQI sub-time unit will be of size $$N_4 - \left\lfloor \frac{N_4}{R_{DD}} \right\rfloor.$$

The first reported CQI among the CQIs of a CQI reporting subband with respect to the ordinal position in uplink control information (UCI) carrying the corresponding CSI reporting is mapped to the first CQI sub-time units. Conversely, the second reported CQI among the CQIs of a CQI reporting subband with respect to the ordinal position in the uplink control information (UCI) carrying the corresponding CSI reporting is mapped to the second CQI sub-time units and so on.

In a yet another consideration, if mod $(N_4, R_{DD}) \neq 0$, each reported CQI for a CQI of a reporting subband except the first one corresponds to $$\frac{N_4}{R_{DD}} PMI$$

sub-time units. The first CQI sub-time unit will be of size $$N_4 - \left\lfloor \frac{N_4}{R_{DD}} \right\rfloor.$$

The first reported CQI among the CQIs of a CQI reporting subband with respect to the ordinal position in uplink control information (UCI) carrying the corresponding CSI reporting is mapped to the first CQI sub-time units. Conversely, the second reported CQI among the CQIs of a CQI reporting subband with respect to the ordinal position in the uplink control information (UCI) carrying the corresponding CSI reporting is mapped to the second CQI sub-time units and so on.

None-Zero Component (NZC) Indication

In Rel-16 Type II CSI, the UE reports nonzero components of LC matrix per each layer. In particular, the UE indicates the NZC per each layer by a bit map of size $2L \times M_v$ wherein a bit value "1" indicates the corresponding element of LC matrix is nonzero and "0" indicates otherwise.

One consideration, for the aforementioned DD compressed CSI is indication of NZC.

In one aspect, all the Q LC matrices share the same nonzero coefficients and thus a UE reports a single NZC indicator.

In a yet another aspect, the NAC indicator is reported by the UE for the Q LC matrices independently. Since the Q LC ($W_2$) matrices may share the same NZC components, an efficient way of indicating the NZC components would be possible and beneficial.

In one aspect of this disclosure, the UE indicates a reference NZC indicator of size $2L \times M_v$. This indicator is treated as legacy bitmap based indicator and indicates the superset of all NZC components of all the Q LC ($W_2$) matrices. Additionally, the UE indicates Q bitmap based NZC indicators, one for each of the Q LC ($W_2$) matrices, with size $K_{NZC}$ wherein $K_{NZC}$ is the number of NZCs, i.e., "1"s, indicated by the reference indicator. Then, for $f_d =$ 1, . . . , Q, the gNB interpret the NZC indication by considering both the reference NZC indicator and the $f_d$-th NZC indicator. As an example, if the UE reports "1" for the k-th bit of $f_d$-th NZC indicator, then the corresponding element of $f_d$-th LC matrix corresponding to the k-th NZC is assumed to be nonzero.

For example, for 2L=8 and Mv=3, if the UE reports [000011001101000011] for reference NZC indication, then UE reports Q indicators with size of 10 bits, i.e., number of NZC reported by reference NZC. Moreover, if a UE reports [1011110111] for $f_d$-th LC matrix (DD basis vector), then it is interpreted as [0010010000110011000000011], i.e., the elements corresponding to the $2^{nd}$ and $7^{th}$ NZC elements indicated by the reference NZC indicator are in fact zero for the $f_d$-th LC matrix.

Part II.4: Report Based on Further Enhanced Type II CSI

In this subsection, the description of the disclosure is provided by exemplifying it with respect to Further Enhanced Type II Port Selection Codebook in the 5G NR system. In the further enhanced Type II port selection codebook (FeType II PS CB), a UE reports indicators $i_1$ and $i_2$. The indicator $i_1$ which may include sub-indicators $i_{1,2}$, $i_{1,6,l}$, $i_{1,7,l}$, $i_{1,8,l}$, for transmission layers $l \in \{1,2,3,4\}$, indicates the spatial channel information and the frequency domain (FD) basis information. In particular, the indicators $i_{1,2}$ selects and indicates CSI-RS ports whereas $i_{1,6,l}$ select M FD basis. Furthermore, the subindicator $i_{1,7,l}$ indicates the position of nonzero coefficients from 2L×M elements of $W_2$ (706) and $i_{1,8,l}$ indicates the strongest coefficient of layer l. Moreover, the indicator $i_2$ consisting subindicators $i_{2,3,l}$, $i_{2,4,l}$, and $i_{2,5,l}$, wherein, they correspond to a 4-bit FD-common amplitude coefficients, a 3-bit FD-specific amplitude coefficients and 16-PSK co-phasing coefficients for angle-delay components, respectively. Then, the gNB constructs the precoder for the l-th layer and t=1, 2, . . . , $N_3$ frequency bin as:

$$W_t^l = \frac{1}{\sqrt{\gamma_{t,l}}} \begin{bmatrix} \sum_{k=0}^{L-1} v_{m^{(i)}} p_{l,0}^{(1)} \sum_{f=0}^{M-1} y_t^{(f)} p_{l,i,f}^{(2)} \varphi_{l,i,f} \\ \sum_{k=0}^{L-1} v_{m^{(i)}} p_{l,1}^{(1)} \sum_{f=0}^{M-1} y_t^{(f)} p_{l,i+L,f}^{(2)} \varphi_{l,i+L,f} \end{bmatrix} \quad \text{Equation 8}$$

where $v_{m^{(i)}}$ is a basis vector associated with the i-th CSI-RS port and $$p_{l,x}^{(1)},$$

x=0, 1 is an amplitude coefficient for the x-th cross-polarization. Additionally, $$y_t^{(f)}$$

is the t=1, 2, . . . , $N_3$-th element of f-th FD basis vector where the FD-basis vectors are selected by $i_{1,6,l}$. Finally, $$p_{l,i,f}^{(2)} \text{ and } \varphi_{l,i,f}$$

are the amplitude and phase coefficients for the (i-th, f-th) angle-delay pair.

In one Method II.4. of the disclosure, a UE derives Doppler frequency shift coefficients that can be reported when a UE reports for time-correlated CSI. In particular, when a UE is configured with higher layer parameter codebookType set to 'typeII-portselection-r17' and the parameter timeCorrelatedCSI in the CSI report configuration is enabled, each PMI value corresponds to a codebook indicator $i_1$, $i_2$ and a Doppler coefficient Indicator $i_3$. The indicator $i_3 = [i_{3,1}, \ldots, i_{3,v}]$ can have sub-indicator $i_{3,l} = [i_{3,l,0}, i_{3,l,1} \ldots, i_{3,l,L-1}]$ wherein $i_{3,l,i} = [d_{l,i,0} \ldots d_{l,i,M-1}]$ and the value $d_{l,i,f}$ corresponds to a Doppler frequency shift $$f_{l,i,f}^{(d)}$$

for the l-th layer and i-th CSI-RS port (spatial basis) and f-th FD basis. The gNB then derives a Doppler coefficient $$\phi_{l,i,f}(n) = e^{j2\pi f_{l,i,f}^{(d)} f^n}$$

for application time, i.e., a PDSCH scheduling time, n based on the reported Doppler frequency $$f_{l,i,f}^{(d)}.$$

The spatial, co-phasing and Doppler information can then be used to construct the precoder associated to a particular layer at an application time n denoted as $W^l(n)$ is given as $$W_t^i(n) = \frac{1}{\sqrt{\gamma_{t,l}}} \begin{bmatrix} \sum_{k=0}^{L-1} v_{m^{(i)}} p_{l,0}^{(1)} \sum_{f=0}^{M-1} y_t^{(f)} p_{l,i,f}^{(2)} \varphi_{l,i,f} \phi_{l,i,f}(n) \\ \sum_{k=0}^{L-1} v_{m^{(i)}} p_{l,1}^{(1)} \sum_{f=0}^{M-1} y_t^{(f)} p_{l,i+L,f}^{(2)} \varphi_{l,i+L,f} \phi_{l,i,f}(n) \end{bmatrix} \quad \text{Equation 9}$$

FIG. 20 illustrates another time-correlated CSI reporting for Further enhanced Type II CSI with Doppler frequency shift coefficients according to an embodiment of the disclosure.

An illustration of embodiment for Method II.4 is provided in FIG. 20. In the figure, the UE transmit an SRS (2000) from which the significant angle-delay components of the channel are identified by the gNB. The gNB then delay precompensate and transmit CSI-RS resources where each port of a CSI-RS resource is associated with one or more angle-delay component of a channel. The UE which is configured with a bundled CSI-RS resource(s) (2001) derives time correlated CSI report (2002) which contains a single spatial information indicator $i_1$, amplitude and co-phasing indicator $\{i_2\}$ and Doppler coefficient indicator $i_3$. Upon receiving the time correlated CSI report (2002), the gNB derives the corresponding precoders (2003)-(2005) for the corresponding application time $n=n_1,n_2,n_3$. In particular, recalling the three-stage precoder format of FeType II CSI, i.e., $$W = W_1 W_2 W_f^H,$$

for application time n the gNB may apply the precoder W(n) by keeping the spatial basis ($W_1$) and FD-basis matrices ($W_f$), while deriving the specific $W_{2,n}$ for $W_2$. Thus, additional Doppler coefficients $\phi$ are used to capture the progression of $W_2$ in the time-domain $n=n_1, n_2 \ldots$.

As a part of the disclosure, the mapping between the reported Doppler coefficient indicator and the Doppler shift can be considered. In one Method, Method II.4.1 a multitude of mapping tables for Doppler coefficient indicator to Doppler frequency shift mapping can be considered. Each table may then correspond to a distinct maximum Doppler frequency $F_{max}$. As an example, Table 8A and 8B illustrate a 3-bit indicator $i_3$ for $F_{max}$ and $F_{max}$, respectively. The codepoint of the indicator can be mapped to the value $d_{l,i,f}$ in an increasing order, i.e., the codepoint 000 is mapped to 0, codepoint 001 to 1, and so on. Based on a specific Doppler value to Doppler frequency mapping table, the value d can be mapped to Doppler frequency shift value $$f_{l,i,f}^{(d)}.$$

TABLE 8A

| $d_{i,l}$ | $f_{l,i,f}^{(d)}$ |
|---|---|
| 0 | −200 |
| 1 | −150 |
| 2 | −100 |
| 3 | −50 |
| 4 | 50 |
| 5 | 100 |
| 6 | 150 |
| 7 | 200 |

TABLE 8B

| $d_{i,l}$ | $f_{l,i,f}^{(d)}$ (Hz) |
|---|---|
| 0 | −500 |
| 1 | −250 |
| 2 | −125 |
| 3 | −100 |
| 4 | 125 |
| 5 | 250 |
| 6 | 375 |
| 7 | 500 |

As part of Method II.4.1., the gNB may indicate, via RRC or MAC-CE signaling, to the UE the mapping table between Doppler coefficient indicator and Doppler frequency shift. As an example, an RRC parameter dopplerMappingTable can be introduced which indicates to the UE the mapping Table to use upon reporting the time-varying CSI. This RRC parameter can be configured under codebookConfig as below.

```
CodebookConfig ::= SEQUENCE {
codebookType CHOICE {
•
•
•
type2 SEQUENCE {
subType CHOICE {
typeII SEQUENCE {
•
•
•
typeII-RI-Restriction BIT STRING (SIZE (2))
},
typeII-PortSelection SEQUENCE {
portSelectionSamplingSize ENUMERATED {n1, n2, n3, n4}
OPTIONAL, -- Need R
typeII-PortSelectionRI-Restriction BIT STRING (SIZE (2))
}
},
```

-continued

```
phaseAlphabetSize ENUMERATED {n4, n8},
subbandAmplitude BOOLEAN,
dopplerMappingTable ENUMERATED {table 1, table2, table3,...}
OPTIONAL
```

In a yet another Method, Method II.4.2, a scalable mapping table for Doppler coefficient indicator to Doppler frequency shift can be considered. Moreover, the UE may receive a configuration from the gNB, about the maximum Doppler frequency $F_{max}$. As an example, Table 9 illustrate a 3-bit indicator $i_3$. The codepoint of the subindicators in $i_3$ can then be mapped to the value $d_{l,i,f}$ in an increasing order, i.e., the codepoint 000 is mapped to 0, codepoint 001 to 1, and so on. Then the value $d_{l,i,f}$ can be mapped to Doppler frequency shift value $$f_{l,i,f}^{(d)}.$$

TABLE 9

| $d_{i,l}$ | $f_{l,i,f}^{(d)}$ (Hz) |
|---|---|
| 0 | $-F_{max}$ |
| 1 | $-3/4\ F_{max}$ |
| 2 | $-1/2\ F_{max}$ |
| 3 | $-1/4\ F_{max}$ |
| 4 | $1/4\ F_{max}$ |
| 5 | $1/2\ F_{max}$ |
| 6 | $3/4\ F_{max}$ |
| 7 | $F_{max}$ |

As part of Method II.4.2, the gNB may indicate, via RRC or MAC-CE signaling, to the UE the maximum Doppler frequency shift. As an example, an RRC parameter maxDopplerShift can be introduced which indicates to the UE the mapping Table to be used upon reporting the time-varying CSI. This RRC parameter can be configured under codebookConfig as below.

```
CodebookConfig-r17 ::= SEQUENCE {
codebookType CHOICE {
•
•
•
type2 SEQUENCE {
subType CHOICE {
typeII-PortSelection-r17 SEQUENCE {
•
•
•
typeII-PortSelection-r17-RI-Restriction BIT STRING (SIZE (2))
},
typeII-PortSelection-r17 SEQUENCE {
portSelectionSamplingSize ENUMERATED {n1, n2, n3, n4}
OPTIONAL, -- Need R
typeII-PortSelectionRI-Restriction BIT STRING (SIZE (2))
}
},
phaseAlphabetSize ENUMERATED {n4, n8},
subbandAmplitude BOOLEAN,
maxDopplerShift ENUMERATED {fmax1, fmax2, fmax3,...}
OPTIONAL
```

One may notice in Tables 8A, 81B and 9 that the Doppler coefficient, indicator and value associated to the Doppler frequency value $$f_{l,i,f}^{(d)} = 0$$

is not available. In the case wherein the UE is configured with an RRC parameter timeVaryingCSI and is expected to report a Doppler information, if the estimated Doppler corresponds to the value $$f_{l,i,f}^{(d)} = 0,$$

then the UE may not report the corresponding component (subindicator) of Doppler information indicator $i_3$. In some embodiments of the disclosure, a single bit indicator can be used to indicate the presence/absence of a subindicator in $i_3$.

To further reduce the CSI overhead associated with reporting the Doppler correction coefficients, the number of reported subindicators of $i_{3,l}$ can be further reduced. In one embodiment of Method II.4, a UE may report Doppler coefficients for only a subset of angle-delay pairs. In one embodiment, an RRC based configuration for the number of angle-delay pairs can be provided to the UE. A parameter $K^{Doppler}$ e.g., named K-DopplerReportedCoefficients, can be configured to the UE with RRC parameter. Upon reception of such configuration, a UE may report Doppler coefficients only for the weakest/strongest $K^{Doppler}$ angle-delay pairs.

In a yet another embodiment, a gNB may update the value of $K^{Doppler}$ via dynamic signaling such as MAC-CE or DCI based (re)configuration. This may be important in the case that the channel condition, the relative speed of the UE with respect of the gNB and other factors change dynamically.

FIG. 21 provides an illustration of one embodiment of Method II.4. In the figure, a UE is configured to report up to $2K_0$ nonzero coefficients. If the UE reports, $K^{NZ} \ll 2K_0$ nonzero coefficients (2100) among the $2L \times M$ angle-delay pairs, the amplitude and co-phasing coefficients for the zero coefficients (2101) $(2L \times M) - K^{NZ}$ will not be reported.

Furthermore, two ways of reporting Doppler coefficients for the non-zero angle-delay components can be considered. In one way, the Doppler coefficients can be reported in a FD-basis specific (delay specific) manner. This is illustrated in the example given in part (b) of FIG. 21. On the other hand, the UE can be configured to report Doppler coefficients in an FD-basis common (delay-common) manner as illustrated in part (c) of FIG. 21. This configuration can be indicated to the UE from gNB by a new higher layer parameter FD-commonDopplerReport.

If a parameter $K^{Doppler}$, i.e., the K-DopplerReportedCoefficients is configured to the UE and the Doppler co-phasing correction is to be updated in a delay-angle (FD specific manner, i.e., FD-commonDopplerReport is enabled (part (b) of FIG. 21), then the UE reports min($K^{NZ}$, $K^{Doppler}$) Doppler co-phasing correction coefficients (considering either the weakest or strongest coefficients). On the other hand, if the UE is configured with a parameter $K^{Doppler}$, i.e., the number of updates is configured to the UE and the Doppler coefficient is to be updated in a FD-basis-common manner i.e., FD-commonDopplerReport is absent (part (c) of FIG. 21), then the UE reports min($K^{NZ}$, $K^{Doppler}$) Doppler coefficients to the selected angle (based on the weakest or strongest coefficients). In other words, if the Doppler coefficients are configured to be reported in FD-basis-common manner, then the UE reports min($K^{NZ}$, $K^{Doppler}$) Doppler coefficients and each reported coefficient is applied to all non-zero FD-basis components in the corresponding spatial basis, i.e., CSI-RS port index.

To configure the UE with either FD-basis specific or FD-basis common Doppler coefficients, this disclosure introduces an RRC parameter, e.g., named as FD-common-DopplerReport. If FD-commonDopplerReport is enabled the Doppler coefficients are reported in FD-basis common manner; otherwise, they are reported in FD-basis specific manner. When the Doppler coefficients are reported in a FD common manner, Equation 9 is modified as Equation 10 by dropping the FD basis subscript (f) from $\phi_{l,i,f}(n)$ as $\phi_{l,i}(n)$.

$$W_t^l(n) = \frac{1}{\sqrt{\gamma_{t,l}}} \begin{bmatrix} \sum_{i=0}^{L-1} v_{m(i)} p_{l,0}^{(1)} \phi_{l,i}(n) \sum_{f=0}^{M-1} y_t^{(f)} p_{l,i,f}^{(2)} \varphi_{l,i,f} \\ \sum_{i=0}^{L-1} v_{m(i)} p_{l,1}^{(1)} \phi_{l,i}(n) \sum_{f=0}^{M-1} y_t^{(f)} p_{l,i+L,f}^{(2)} \varphi_{l,i+L,f} \end{bmatrix} \quad \text{Equation 10}$$

Another approach to further limit the CSI feedback overhead associated with the Doppler information feedback is to report a single strongest Doppler coefficient and the remaining other remainingmin($K^{(3)}$, $K^{NZ}$)−1 coefficients on the basis of the strongest coefficient. In particular, $K_1$ and $K_2$ bits can be used to report the strongest Doppler coefficient and the remaining coefficients, where $K_1 > K_2$, respectively. In this case an indicator to indicate the angle-delay component associated with the strongest beam is required.

One example is a $\lceil \log_2 L \rceil$-bit indicator $i_{3,l,2}$ for the case wherein FD-commonDopplerReport is enabled. Another example is a $\lceil \log_2(L \times M) \rceil$-bit indicator $i_{3,l,2}$ for the case wherein FD-commonDopplerReport is absent. As an example, if the strongest Doppler coefficient $$f_{l,i3,l,2,f}^{(d)}$$

is resorted based on a 3-bit subindicator as in TABLE 9, then 2-bit subindicators can be considered for the remaining beams with the following indicator to value mapping table.

TABLE 10

| $d_{i,l}$ | $f_{l,i,f}^{(d)}$ |
|---|---|
| 0 | 0 |
| 1 | $1/3\, f_{l,i3,l,2,f}^{(d)}$ |
| 2 | $2/3\, f_{l,i3,l,2,f}^{(d)}$ |
| 3 | $1\, f_{l,i3,l,2,f}^{(d)}$ |

In accordance with another aspect of the disclosure, a method performed by a base station in a wireless communication system is provided, the method includes transmitting, to a terminal, configuration information about CSI-RS resources for time-varying CSI measurement.

In accordance with an aspect of the disclosure, a method performed by a user terminal in a wireless communication system is provided. The method includes receiving, from a base station, configuration information CSI-RS resources for time-varying CSI measurement.

In accordance with another aspect of the disclosure, a method performed by a base station in a wireless communication system is provided, the method includes transmitting, to a terminal, configuration information about CSI reporting mechanism for time-varying CSI. In addition, a configuration information based on various codebook types for precoding matrix indicator(s) (PMI(s)) that can be used for time-varying CSI is disclosed. The configuration information provides the UE a method to incorporate Doppler information of the time-varying channel into the reported CSI, in particular PMI.

In accordance with another aspect of the disclosure, a method performed by a terminal in a wireless communication system is provided, the method includes, from a base station, configuration information for CSI reporting mechanism for time-varying CSI measurement. In addition, according to the codebook configuration information, a terminal derives a PMI(s) for time-correlated CSI with an additional Doppler information.

In accordance with another aspect of the disclosure, a method performed by a terminal in a wireless communication system is provided, the method includes indications of terminal's capability on measuring and reporting time-correlated CSI.

In accordance with another aspect of the disclosure, a method performed by a base station in a wireless communication system is provided, the method includes receiving terminal's capability information and providing a corresponding configuration information time-correlated CSI measurement and reporting.

In accordance with another aspect of the disclosure, a method performed by a base station in a wireless communication system is provided, the method includes receiving a CSI-report with Doppler information and constructing the time-varying precoder matrices for data transmission(s) in physical downlink shared channel (PDSCH).

In accordance with another aspect of the disclosure, a method performed by a base station in a wireless communication system is provided. The method includes transmitting, to a terminal, configuration information about channel state information reference signal (CSI-RS) resources for time-varying CSI measurement.

In accordance with an aspect of the disclosure, a method performed by a user terminal in a wireless communication system is provided. The method includes receiving, from a base station, configuration information CSI-RS resources for time-varying CSI measurement.

In accordance with another aspect of the disclosure, a method performed by a base station in a wireless communication system is provided. The method includes transmitting, to a terminal, configuration information about CSI reporting mechanism for time-varying CSI. In addition, a configuration information based on various codebook types for precoding matrix indicator(s) (PMI(s)) that can be used for time-varying CSI is disclosed. The configuration information provides the UE a method to incorporate Doppler information of the time-varying channel into the reported CSI, in particular PMI.

In accordance with another aspect of the disclosure, a method performed by a terminal in a wireless communication system is provided. The method includes, from a base station, configuration information for CSI reporting mechanism for time-varying CSI measurement. In addition, according to the codebook configuration information, a terminal derives a PMI(s) for time-correlated CSI with an additional Doppler information.

In accordance with another aspect of the disclosure, a method performed by a terminal in a wireless communication system is provided. The method includes indications of terminal's capability on measuring and reporting time-correlated CSI.

In accordance with another aspect of the disclosure, a method performed by a base station in a wireless communication system is provided. The method includes receiving terminal's capability information and providing a corresponding configuration information time-correlated CSI measurement and reporting.

In accordance with another aspect of the disclosure, a method performed by a base station in a wireless communication system is provided. The method includes receiving a CSI-report with Doppler information and constructing the time-varying precoder matrices for data transmission(s) in physical downlink shared channel (PDSCH).

While the disclosure has been shown and described with reference to various embodiments thereof, it will be understood by those skilled in the art that various changes in form and details may be made therein without departing from the spirit and scope of the disclosure as defined by the appended claims and their equivalents.

Abbreviations

2D Two-dimensional
ACK Acknowledgement
AoA Angle of arrival
AoD Angle of departure
ARQ Automatic Repeat Request
BW Bandwidth
CDM Code Division Multiplexing
CP Cyclic Prefix
C-RNTI Cell RNTI
CRS Common Reference Signal
CRI CSI-RS resource indicator
CSI Channel State Information
CSI-RS Channel State Information Reference Signal
CQI Channel Quality Indicator
DCI Downlink Control Information
dB deciBell
DL Downlink
DL-SCH DL Shared Channel
DMRS Demodulation Reference Signal
eMBB Enhanced mobile broadband
eNB eNodeB (base station)
FDD Frequency Division Duplexing
FDM Frequency Division Multiplexing
FFT Fast Fourier Transform
HARQ Hybrid ARQ
IFFT Inverse Fast Fourier Transform
LAA License assisted access
LBT Listen before talk
LTE Long-term Evolution
MIMO Multi-input multi-output
mMTC massive Machine Type Communications
MTC Machine Type Communications
MU-MIMO Multi-user MIMO
NACK Negative ACKnowledgement
NW Network
OFDM Orthogonal Frequency Division Multiplexing
PBCH Physical Broadcast Channel
PDCCH Physical Downlink Control Channel
PDSCH Physical Downlink Shared Channel
PHY Physical layer
PRB Physical Resource Block PMI Precoding Matrix Indicator
PSS Primary Synchronization Signal
PUCCH Physical Uplink Control Channel
PUSCH Physical Uplink Shared Channel
QoS Quality of service
RAN Radio access network
RAT Radio access technology
RB Resource Block
RE Resource Element
RI Rank Indicator
RRC Radio Resource Control
RS Reference Signals
RSRP Reference Signal Received Power
SDM Space Division Multiplexing
SINR Signal to Interference and Noise Ratio
SPS Semi-Persistent Scheduling
SRS Sounding RS
SF Subframe
SSS Secondary Synchronization Signal
SU-MIMO Single-user MIMO
TDD Time Division Duplexing
TDM Time Division Multiplexing
TB Transport Block
TP Transmission point
TRP Transmission reception point
TTI Transmission time interval
UCI Uplink Control Information
UE User Equipment
UL Uplink
UL-SCH UL Shared Channel
URLLC Ultra-reliable low-latency communication

What is claimed is:

1. A method performed by a user equipment (UE) in a communication system, the method comprising:
transmitting, to a base station, capability information indicating a capability for a time correlated channel state information (CSI) report;
receiving, from the base station, a first configuration enabling a time correlated CSI report and a second configuration indicating a mapping relationship between codepoints of an indicator and Doppler frequency shift values;
receiving, from the base station, one or more first CSI-reference signals (CSI-RSs) and one or more second CSI-RSs;
obtaining:
based on the one or more first CSI-RSs, a first Doppler frequency shift value according to the first configuration, wherein the first Doppler frequency shift value is non-zero; and
based on the one or more second CSI-RSs, a second Doppler frequency shift value according to the first configuration, wherein the second Doppler frequency shift value is zero,
transmitting, to the base station, a first time correlated CSI report including the indicator corresponding to a codepoint indicating the first Doppler frequency shift value and a second time correlated CSI report without the indicator,
wherein the codepoint of the indicator indicating the first Doppler frequency shift value is based on the second configuration,
wherein the first time correlated CSI report includes a bit indicating a presence of the indicator, and
wherein the second time correlated CSI report includes the bit indicating an absence of the indicator.

2. The method of claim 1,
wherein the second configuration indicates a table among a plurality of candidate tables,
wherein the mapping relationship between codepoints of the indicator and Doppler frequency shift values is determined based on the table, and
wherein each of the plurality of candidate tables defines a different mapping relationship between the codepoints of the indicator and the Doppler frequency shift values.

3. The method of claim 1,
wherein the second configuration indicates a maximum value among a plurality of candidate maximum values for a Doppler frequency shift value, and
wherein the mapping relationship between codepoints of the indicator and Doppler frequency shift values is determined based on the maximum value.

4. A method performed by a base station in a communication system, the method comprising:
receiving, from a user equipment (UE), capability information indicating a capability for a time correlated channel state information (CSI) report;
transmitting, to the UE, a first configuration enabling a time correlated CSI report and a second configuration indicating a mapping relationship between codepoints of an indicator and Doppler frequency shift values;
transmitting, to the UE, one or more first CSI-reference signals (CSI-RSs) and one or more second CSI-RSs, wherein the one or more first CSI-RSs are associated with a first Doppler frequency shift value and the one or more second CSI-RSs are associated with a second Doppler frequency shift value; and
receiving, from the UE, a first time correlated CSI report including an indicator corresponding to a codepoint indicating the first Doppler frequency shift value, and a second time correlated CSI report without the indicator,
wherein the first Doppler frequency shift value is non-zero,
wherein the second Doppler frequency shift value is zero,
wherein the codepoint of the indicator indicating the first Doppler frequency shift value is based on the second configuration,
wherein the first time correlated CSI report includes a bit indicating a presence of the indicator, and
wherein the second time correlated CSI report includes the bit indicating an absence of the indicator.

5. The method of claim 4,
wherein the second configuration indicates a table among a plurality of candidate tables,
wherein the mapping relationship between codepoints of the indicator and Doppler frequency shift values is determined based on the table, and
wherein each of the plurality of candidate tables defines a different mapping relationship between the codepoints of the indicator and the Doppler frequency shift values.

6. The method of claim 4,
wherein the second configuration indicates a maximum value among a plurality of candidate maximum values for a Doppler frequency shift value, and
wherein the mapping relationship between codepoints of the indicator and Doppler frequency shift values is determined based on the maximum value.

7. A user equipment (UE) in a communication system, the UE comprising:

a transceiver; and at least one processor configured to:

transmit, to a base station, capability information indicating a capability for a time correlated channel state information (CSI) report, receive, from the base station, a first configuration enabling a time correlated CSI report and a second configuration indicating a mapping relationship between codepoints of an indicator and Doppler frequency shift values, receive, from the base station, one or more first CSI-reference signals (CSI-RSs) and one or more second CSI-RSs, obtain:

based on the one or more first CSI-RSs, a first Doppler frequency shift value according to the first configuration, wherein the first Doppler frequency shift value is non-zero, and based on the one or more second CSI-RSs, a second Doppler frequency shift value according to the first configuration, wherein the second Doppler frequency shift value is zero, transmit, to the base station, a first time correlated CSI report including the indicator corresponding to a codepoint indicating the first Doppler frequency shift value and a second time correlated CSI report without the indicator, wherein the codepoint of the indicator indicating the first Doppler frequency shift value is based on the second configuration, wherein the first time correlated CSI report includes a bit indicating a presence of the indicator, and wherein the second time correlated CSI report includes the bit indicating an absence of the indicator.

8. The UE of claim 7, wherein the second configuration indicates a table among a plurality of candidate tables, wherein the mapping relationship between codepoints of the indicator and Doppler frequency shift values is determined based on the table, and wherein each of the plurality of candidate tables defines a different mapping relationship between the codepoints of the indicator and the Doppler frequency shift values.

9. The UE of claim 7, wherein the second configuration indicates a maximum value among a plurality of candidate maximum values for a Doppler frequency shift value, and wherein the mapping relationship between codepoints of the indicator and Doppler frequency shift values is determined based on the maximum value.

10. A base station in a communication system, the base station comprising:

a transceiver; and at least one processor configured to:

receive, from a user equipment (UE), capability information indicating a capability for a time correlated channel state information (CSI) report, transmit, to the UE, a first configuration enabling a time correlated CSI report and a second configuration indicating a mapping relationship between codepoints of an indicator and Doppler frequency shift values, transmit, to the UE, one or more first CSI-reference signals (CSI-RSs) and one or more second CSI-RSs, wherein the one or more first CSI-RSs are associated with a first Doppler frequency shift value and the one or more second CSI-RSs are associated with a second Doppler frequency shift value, and receive, from the UE, a first time correlated CSI report including an indicator corresponding to a codepoint indicating the first Doppler frequency shift value, and a second time correlated CSI report without the indicator, wherein the first Doppler frequency shift value is non-zero, wherein the second Doppler frequency shift value is zero, wherein the codepoint of the indicator indicating the first Doppler frequency shift value is based on the second configuration, wherein the first time correlated CSI report includes a bit indicating a presence of the indicator, and wherein the second time correlated CSI report includes the bit indicating an absence of the indicator.

11. The base station of claim 10, wherein the second configuration indicates a table among a plurality of candidate tables, wherein the mapping relationship between codepoints of the indicator and Doppler frequency shift values is determined based on the table, and wherein each of the plurality of candidate tables defines a different mapping relationship between the codepoints of the indicator and the Doppler frequency shift values.

12. The base station of claim 10, wherein the second configuration indicates a maximum value among a plurality of candidate maximum values for a Doppler frequency shift value, and wherein the mapping relationship between codepoints of the indicator and Doppler frequency shift values is determined based on the maximum value.

* * * * *